(12) United States Patent
Sekiguchi et al.

(10) Patent No.: US 7,737,589 B2
(45) Date of Patent: Jun. 15, 2010

(54) AXIAL FAN MOTOR

(75) Inventors: Osamu Sekiguchi, Kiryu (JP); Taro Tanno, Kiryu (JP); Yoshihiko Kato, Kiryu (JP); Tetsuya Hioki, Kiryu (JP); Asahi Higo, Kiryu (JP)

(73) Assignee: Nidec Servo Corporation, Gumma (JP)

( * ) Notice: Subject to any disclaimer, the term of this patent is extended or adjusted under 35 U.S.C. 154(b) by 298 days.

(21) Appl. No.: 12/040,960

(22) Filed: Mar. 3, 2008

(65) Prior Publication Data

US 2008/0157634 A1    Jul. 3, 2008

Related U.S. Application Data

(63) Continuation-in-part of application No. 11/697,749, filed on Apr. 9, 2007, now Pat. No. 7,622,838.

(30) Foreign Application Priority Data

Apr. 14, 2006 (JP) .............................. 2006-111503
Oct. 31, 2006 (JP) .............................. 2006-296235

(51) Int. Cl.
*H02K 5/16* (2006.01)

(52) U.S. Cl. .............................. 310/90; 310/89; 310/91; 310/67 R

(58) Field of Classification Search ................ 310/71, 310/67 R, 89–90, 91
See application file for complete search history.

(56) References Cited

U.S. PATENT DOCUMENTS

| 4,438,361 | A | * | 3/1984 | Manson ........................ 310/90 |
| 4,607,182 | A | * | 8/1986 | Ballhaus ....................... 310/90 |
| 4,612,468 | A | * | 9/1986 | Sturm et al. ............... 310/67 R |
| 4,634,908 | A | * | 1/1987 | Sturm .......................... 310/64 |
| 4,823,034 | A | * | 4/1989 | Wrobel ..................... 310/67 R |
| 4,922,162 | A | * | 5/1990 | Shiraki et al. ............... 310/268 |
| 5,013,957 | A | * | 5/1991 | Wrobel ................. 310/216.049 |
| 5,925,948 | A | * | 7/1999 | Matsumoto ............... 310/67 R |

OTHER PUBLICATIONS

Watanabe et al.; "Axial Fan Motor"; U.S. Appl. No. 11/697,749, filed Apr. 9, 2007.

* cited by examiner

*Primary Examiner*—Thanh Lam
(74) *Attorney, Agent, or Firm*—Keating & Bennett, LLP

(57) ABSTRACT

A motor includes a rotor portion including a shaft and a rotor magnet rotatable about a center axis, an armature arranged opposite to the rotor magnet to generate a torque therebetween, a circuit board arranged below the armature in an axial direction substantially parallel to the center axis and including a control circuit controlling rotation of the rotor portion, and a base portion including a bearing holder which supports the armature on its outer side surface and the shaft on its inner side surface via a bearing member. The armature is pressed against the bearing holder in the axial direction with an elastic member.

16 Claims, 29 Drawing Sheets

AXIAL FAN MOTOR

BACKGROUND OF THE INVENTION

1. Field of the Invention

The present invention relates to an axial fan motor.

2. Description of the Related Art

An axial fan motor for cooling heat generating electronic parts is generally mounted on household electric appliances and various OA/IT equipment. Recently, demand for a large air flow capacity of the axial fan has increased because of the increase in the heat generated by, and the reduction in product costs, of household electric appliance and various OA/IT equipment. When the air flow capacity of an axial fan motor is increased, however, there is a tendency that noise due to an electromagnetic exciting force and rotation of vanes in the axial fan is increased. Further, a demand for noise reduction has increased for the pursuit of a more comfortable environment, and improvements corresponding thereto have been developed.

In JP-A-10-159792, vibration reduction is intended by providing vibration isolating rubber between a motor shaft and a fan boss.

In JP-A-2003-269381, vibration reduction is intended by providing vibration isolating rubber between an inner ring member fitted onto a motor shaft and an outer ring member fitted into a fan boss.

In JP-A-2003-286997, vibration reduction is intended by providing vibration isolating rubber between a fan shaft and a fan body.

In JP-A-07-213005, vibration reduction of a fan motor is intended by the use of an attenuation material.

In all of the above-described patent documents, a vibration attenuation material such as a vibration isolating rubber, etc., is provided in order to achieve vibration reduction, but cannot be considered to be a fundamental measure for reducing vibration since a vibration source and the vibration isolating rubber are in contact with each other.

Meanwhile, it is desirable that a stator core and a sleeve, which supports the stator core, be separated from each other as far as possible for the purpose of vibration reduction and noise reduction, and it is preferred that a contact area between the stator core and the sleeve be made small. Recently, recycling of resources is advocated, and products which may be disassembled and recycled are desired for axial fan motors.

A stator core and a sleeve, which supports the stator core, in conventional fan motors and blowers are joined together by measures such as bonding, caulking, welding, etc., but when a stator core is fixed to the sleeve by such measures, disassembly cannot be performed unless the sleeve is broken, so that recycling of the resource cannot be achieved.

SUMMARY OF THE INVENTION

In order to overcome the problems described above, preferred embodiments of the present invention provide an axial fan motor generating little noise and capable reducing structural noise generated by vibrations of the motor, etc., even when the axial fan motor is incorporated into various devices.

According to a preferred embodiment of the present invention, a motor preferably includes a rotor portion including a shaft and a rotor magnet and rotatable about a center axis, an armature arranged opposite to the rotor magnet to generate a torque therebetween, a circuit board arranged below the armature in an axial direction substantially parallel to the center axis and including a control circuit controlling rotation of the rotor portion, and a base portion including a bearing holder which supports the armature on its outer side surface and the shaft on its inner side surface via a bearing member. The armature is pressed against the bearing holder in the axial direction with an elastic member.

The elastic member may be a helical coil spring arranged around the outer side surface of the bearing holder.

The armature preferably includes a stator core made of magnetic material, an insulator covering the stator core, and a coil around the stator core with the insulator therebetween, and the insulator is pressed against the bearing holder with the elastic member.

The stator core and the bearing holder are preferably spaced apart from each other in a radial direction substantially perpendicular to the center axis.

The insulator preferably includes a supporting portion supporting the elastic member.

The insulator preferably includes an upper insulator covering an axially upper portion of the stator core and a lower insulator covering an axially lower portion of the stator core, wherein the lower insulator includes the supporting portion.

The outer side surface of the bearing holder may be provided with at least one projection thereon, and the armature is pressed against the projection with the elastic member.

The lower insulator preferably includes a positioning portion axially pressing the projection and axially positioning the bearing holder.

The positioning portion preferably includes a circumferential movement limiting portion which comes into contact with the projection to circumferentially position the bearing holder.

The armature is preferably arranged such that it may be pressed downward in the axial direction, the positioning portion and the circumferential movement limiting portion are moved away from the projection to release positioning of the bearing holder in the circumferential direction and the radial direction, and the armature is able to be removed from the bearing holder by one of the armature and the bearing holder being moved relative to the other.

The outer side surface of the bearing holder may be provided with at least one recess, and the armature is pressed against the recess with the elastic member.

The lower insulator may have a positioning portion and is axially positioned relative to the bearing holder by axially pressing a top surface of the recess by the positioning portion.

The positioning portion may have a circumferential movement limiting portion capable of coming into contact with side surfaces of the recess which are arranged on both circumferential sides of the top surface thereof, whereby the lower insulator is circumferentially positioned relative to the bearing holder.

The circumferential and axial positioning of the armature may be released by pressing the armature axially downward, and then the armature is placed in a condition in which the armature can be separated from the bearing holder, by rotating the armature relative to the bearing holder.

Other features, elements, advantages and characteristics of the present invention will become more apparent from the following detailed description of preferred embodiments thereof with reference to the attached drawings.

DETAILED DESCRIPTION OF PREFERRED EMBODIMENTS

Figure 1:
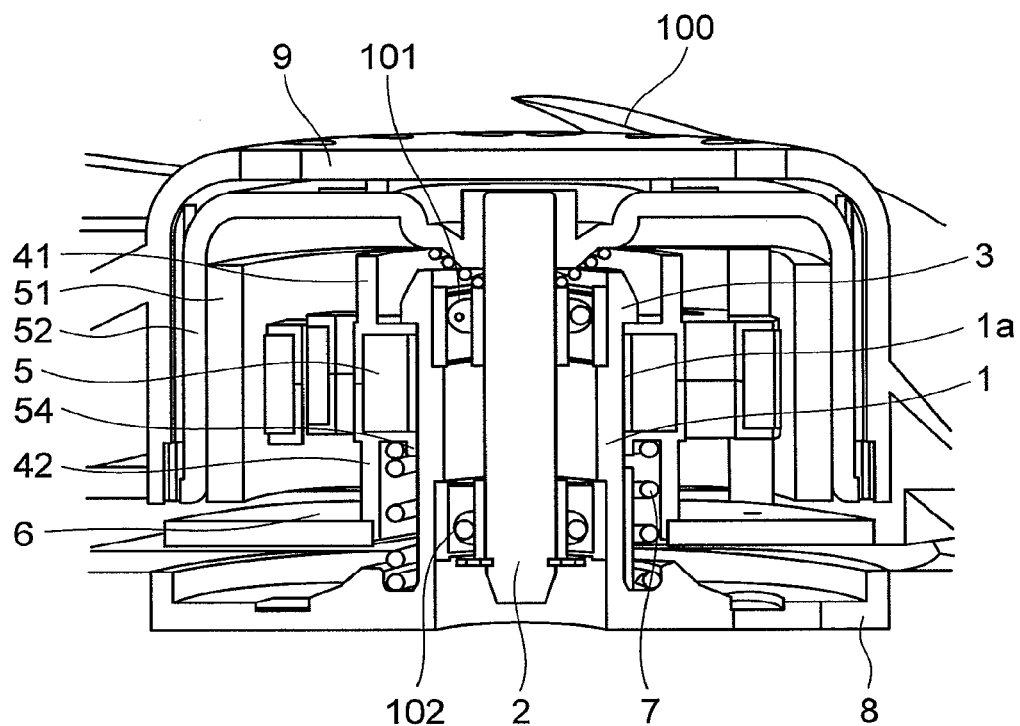
FIG. 1 is a cross-sectional view of an axial fan motor according to a first preferred embodiment of the present invention.

Referring to FIGS. 1 through 34D, preferred embodiments of the present invention will be described in detail. It should be noted that in the explanation of the preferred embodiments of the present invention, when positional relationships among and orientations of the different components are described as being up/down or left/right, ultimately positional relationships and orientations that are in the drawings are indicated; positional relationships among and orientations of the components once having been assembled into an actual device are not indicated. Meanwhile, in the following description, an axial direction indicates a direction substantially parallel to a rotation axis, and a radial direction indicates a direction substantially perpendicular to the rotation axis.

First Preferred Embodiment

First, a first preferred embodiment of the present invention is described with reference to FIGS. 1 to 9. In addition, the same reference numerals in the respective figures denote the same parts.

FIG. 1 is a cross sectional view showing an axial fan motor according to a first preferred embodiment of the present invention.

Figure 2:
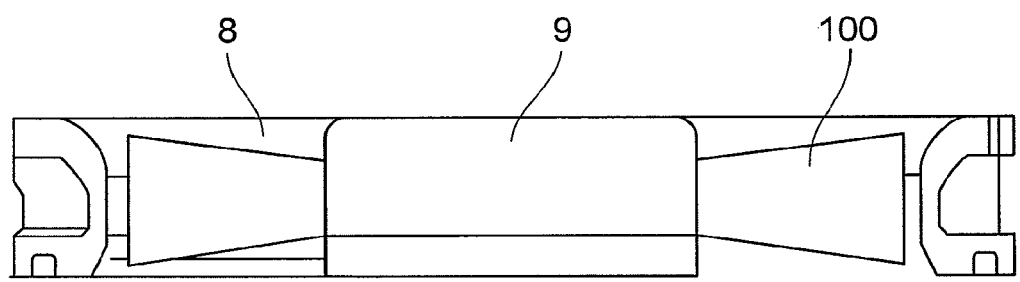
FIG. 2 is a view showing an entire construction of the axial fan motor according to the first preferred embodiment of the present invention.

FIG. 2 is a view showing an entire construction of the axial fan motor according to the first preferred embodiment of the present invention. In FIGS. 1 and 2, the reference numeral 1 denotes a sleeve through which a rotating shaft 2 of the axial fan motor extends. The reference numeral 3 denotes stoppers mounted to a tip end of the sleeve 1. The shaft 2 and the sleeve 1 are mounted with bearings 101, 102 therebetween. The reference numeral 41 denotes an upper insulator and 42 a lower insulator. The reference numeral 5 denotes a stator core and a fan to which a rotor including a magnet 51 and a rotor case 52 is provided, the fan being mounted to an outer periphery opposed to the stator core 5. This is called an outer rotor type motor. The reference numeral 6 denotes a substrate with electronic parts mounted thereon. A stator substrate set is defined by the insulators 41, 42, the stator core 5, and the substrate 6 among the respective parts, and a motor portion is defined by the stator substrate set and the rotor. The reference numeral 8 denotes a venturi provided with a clearance defined between the venturi and a tip end of the fan, and a spring 7 is mounted between the substrate 6 and the venturi 8. In FIG. 1, the reference numeral 9 denotes a hub of the fan 100, and 54 denotes a stop for preventing inclination of the fan 100. Also, a space 1*a* is defined between the stator core 5 and the sleeve 1.

In FIG. 2, the reference numeral 9 denotes the hub of the fan and the rotor described above is mounted in the hub 9. Since the motor portion includes the stator substrate set and the rotor, low vibration and low noise of the entire fan can be achieved provided that vibration from the stator core 5 of the motor portion which is a source of vibration can be minimized from the viewpoint of vibration reduction and noise reduction of the fan motor. Also, in FIG. 2, the reference numeral 8 denotes the venturi and reference numeral 100 denotes the fan.

Figure 3:
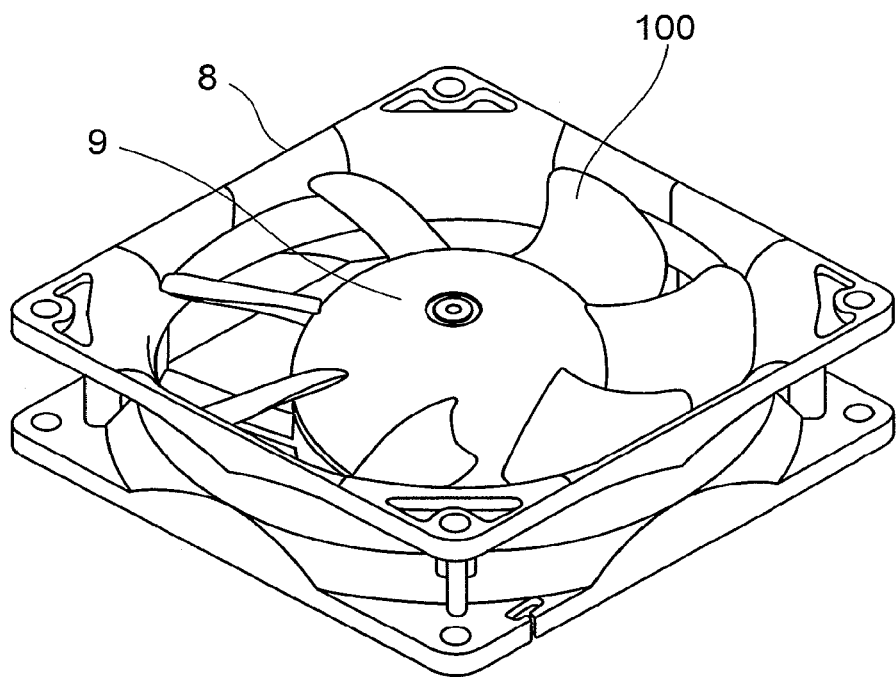
FIG. 3 is a perspective view of the axial fan motor according to the first preferred embodiment of the present invention.

FIG. 3 is a perspective view showing the axial fan motor. FIG. 3 is a configuration shown in FIG. 1 as viewed obliquely. As shown in FIG. 1, four stoppers 3 are equiangularly mounted to the tip end of the sleeve 1 which is mounted integral with the venturi 8; and the stator substrate set including the insulators 41, 42, the stator core 5, and the substrate 6 is fitted onto the sleeve 1 in a manner to pass by the stoppers 3. The stator substrate set is rotated and fixed in order to shift positions of notches (not shown) through which the stoppers 3 pass. The hub 9 of the fan 100 shown in FIG. 2 is mounted so as to cover the stator substrate set, wherein an outer rotor type axial fan motor is defined, as shown in FIG. 3.

Figure 4:
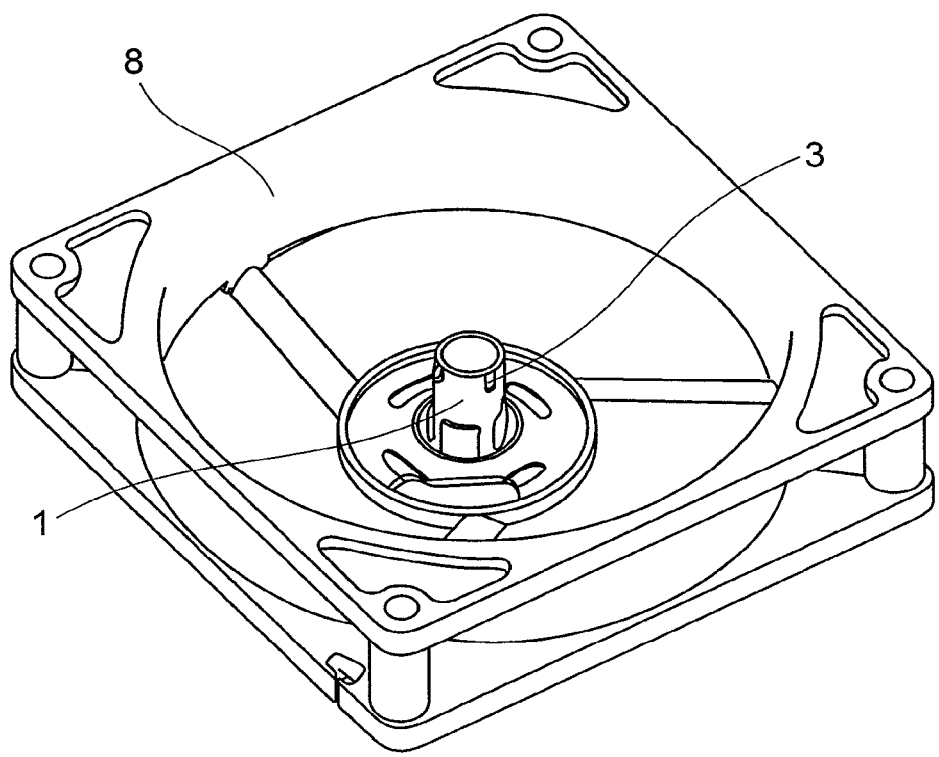
FIG. 4 is a perspective view of a venturi of the axial fan motor according to the first preferred embodiment of the present invention.

Constituent portions of the axial fan motor shown in FIGS. 1 and 3 will be described with reference to FIGS. 4 to 8. FIG. 4 is a perspective view of the venturi. In FIG. 4, the sleeve 1 mounted to a central portion of a bottom surface of the venturi 8 is cylindrical-shaped and four stoppers 3 according to the present preferred embodiment are mounted to an upper portion of the sleeve 1 in cross directions. While four stoppers 3 according to the present preferred embodiment are mounted to the tip end of the sleeve 1, the number of stoppers is not necessarily required to be four, but it suffices that the number of stoppers is at least three or more.

Figure 5:
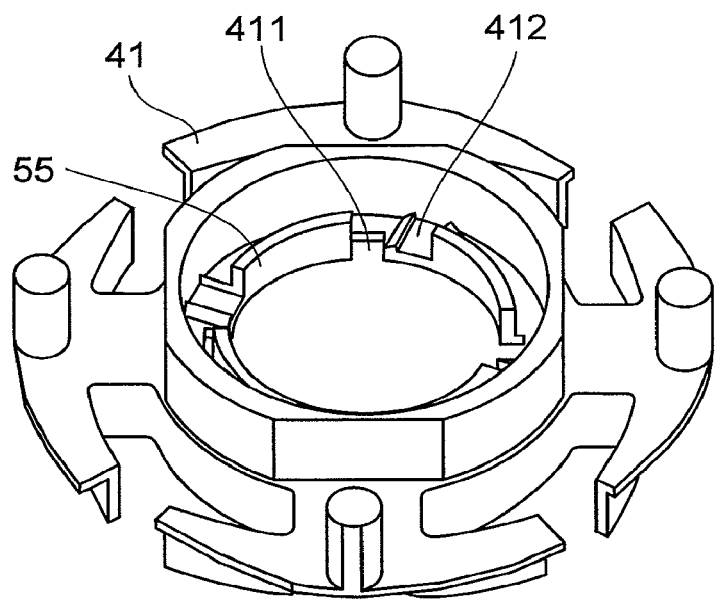
FIG. 5 is a perspective view of an upper insulator of the axial fan motor according to the first preferred embodiment of the present invention.

FIG. 5 is a perspective view of the upper insulator 41. In FIG. 5, the upper insulator 41 includes notches 411 through which the stoppers 3 (shown in FIG. 4) on the upper portion of the sleeve 1 pass, stopper supports 412 to which the stoppers 3 are fixed, and a wall 55 for preventing inclination of the stator substrate set.

Figure 6:
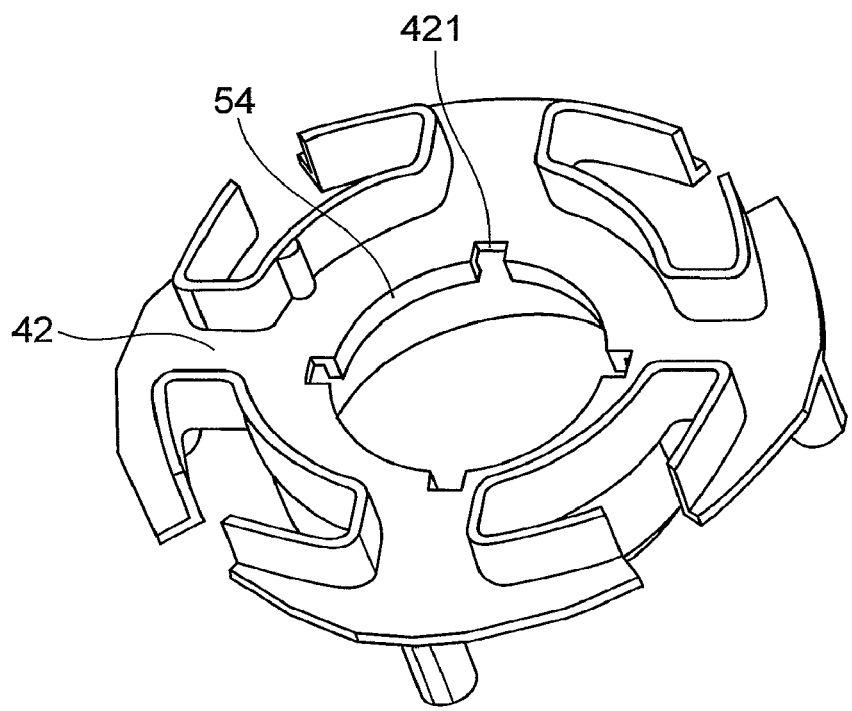
FIG. 6 is a perspective view of a lower insulator of the axial fan motor according to the first preferred embodiment of the present invention.

FIG. 6 is a perspective view of the lower insulator 42. In FIG. 6, the lower insulator 42 is provided with, in the same manner as the upper insulator 41 shown in FIG. 5, notches 421 for passage therethrough of the stoppers 3 (shown in FIG. 4) and a wall 54 for preventing inclination of the stator substrate set.

Figure 7:
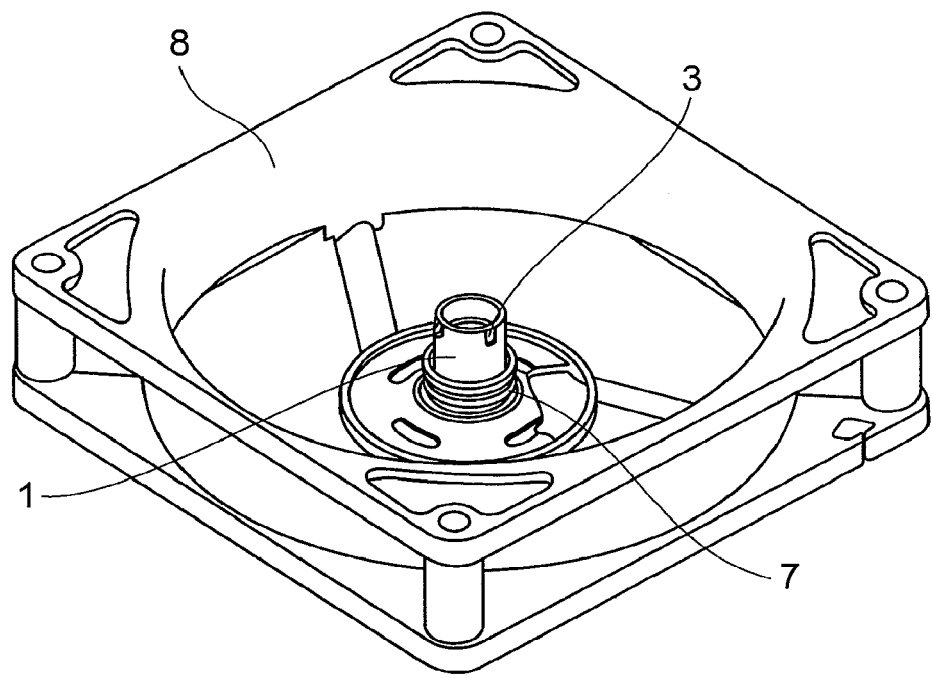
FIG. 7 is a perspective view showing a state when a spring is fitted onto a sleeve of the axial fan motor according to the first preferred embodiment of the present invention.
Figure 8:
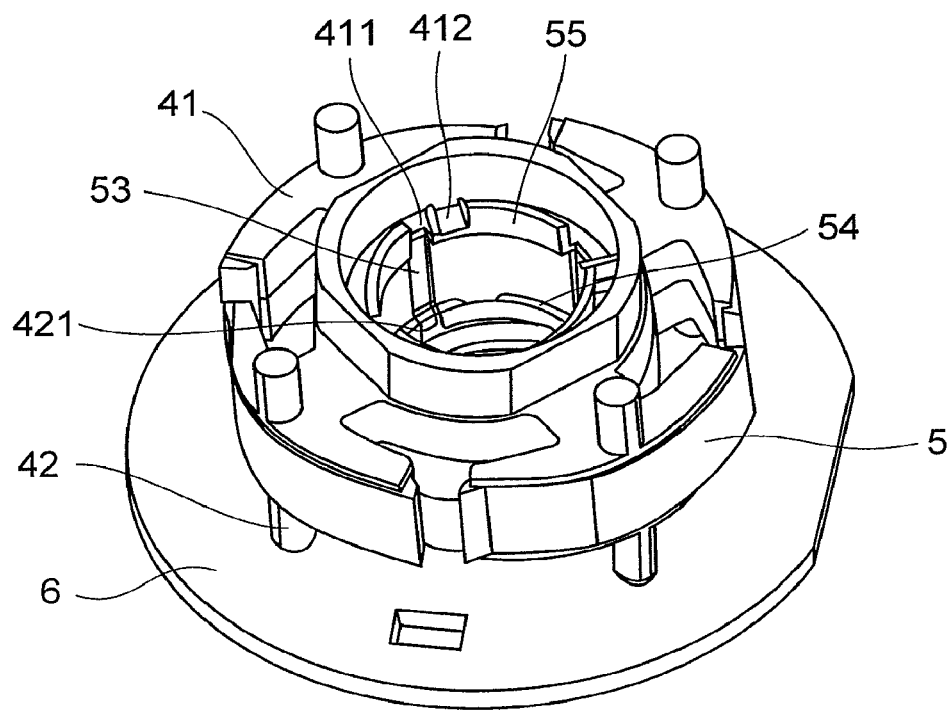
FIG. 8 is a perspective view of a stator substrate of the axial fan motor according to the first preferred embodiment of the present invention.

FIG. 7 is a perspective view showing a state when the spring 7 is fitted onto the sleeve 1 and FIG. 8 is a perspective view of the stator substrate set, in which the insulator 4 (the upper insulator 41 and the lower insulator 42), the stator core 5, and the substrate 6 are combined together. As shown in FIG. 8, notches 53, 411, and 421 are provided on inner sides of upper portions of the stator core 5 and the insulators 41, 42 to enable the stoppers 3 to pass therethrough when fitted onto the sleeve 1.

Subsequently, the assembly procedure will be described with reference to the drawings. First, the spring 7 is fitted onto the sleeve 1 of the venturi 8 as shown in FIG. 7. Subsequently, the stator substrate set shown in FIG. 8 is fitted onto the sleeve 1 mounted to a central portion of the venturi 8. At this time, the stoppers 3 of the sleeve 1 are inserted in a manner to pass through the notches 53, 411, 421 formed on the inner sides of the upper portions of the stator core 5 and the insulators 41, 42. Stated conversely, the stator substrate set is fitted so that the stoppers 3 pass through the inside of notches 53, 411, 421. Here, the respective notches 53, 411, 421 inside the stator substrate set are sized to enable passage of the stoppers 3 therethrough.

After the stator substrate set is fitted, the stator substrate set and the sleeve 1 are fixed together by pushing the fitted stator substrate set toward a bottom portion of the venturi 8 and rotating the stator substrate set. Specifically, the stator substrate set is rotated until the stoppers 3 having passed through the notches 411 of the upper insulator 41 shown in FIG. 5 come to positions approximate the stopper supports 412 and fixed. In addition, since the stator substrate set is rotated in the same direction as a direction (counterclockwise in the present preferred embodiment) of the rotation of the fan and is fixed thereto, it will not rotate in a reverse direction to that at the time of mounting, and therefore will not come off even in the case where the fan is mounted and operated. That is, since a force acts on the stator substrate set in the direction of rotation of the fan but a force does not act thereon in a reverse direction, the stator substrate set will not come off. In view of safety, however, the stopper supports 412 are downwardly concave in shape to allow the stoppers 3 to be fitted therein, thus preventing the stoppers from coming off. Also, the stopper supports 412 have a function of positioning the stator substrate set. Also, since the walls 54, 55 for preventing inclination are provided in order to maintain levelness of the stator substrate set, it is possible to minimize fluctuations of the rotating speed when the fan 100 rotates and a stable air volume can be supplied.

In addition, while the stator substrate set is rotated and fixed in the present preferred embodiment, a washer may be used between an upper surface of the upper insulator 41 and lower surfaces of the stoppers 3. At this time, the washer requires notches sized to enable the stoppers 3 to pass therethrough, and notches to which the stoppers 3 are fixed.

Since the space 1*a* shown in FIG. 1 is provided between the stator core 5 and the sleeve 1, the space 1*a* prevents vibrations of the stator core 5 from being transmitted directly to the sleeve. Also, vibrations transmitted directly to a base of the sleeve 1 from the substrate 6 are also attenuated by the spring 7.

Figure 9:
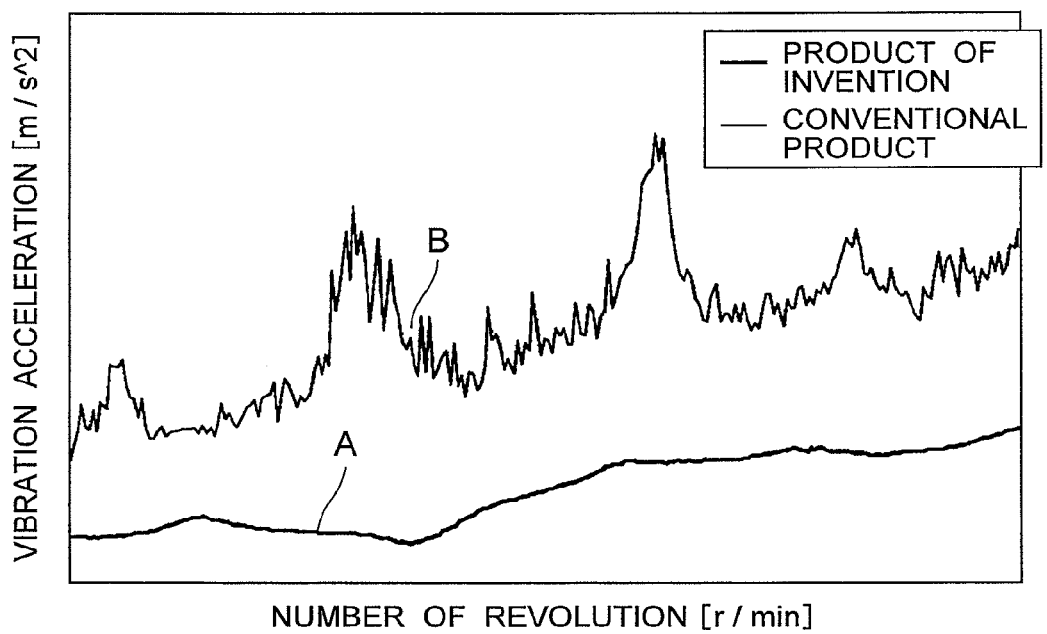
FIG. 9 is a view illustrating a comparison in vibrations between the first preferred embodiment of the present invention and a conventional product.

Vibrations generated in the fan motor according to the present preferred embodiment and a conventional fan motor will be described with reference to FIG. 9. Vibrations in the vicinity of the base of the sleeve 1 of the venturi 8 were measured. In addition, the respective components such as the venturi 8, the insulators 41, 42, the fan 100, etc., preferably have the same physical properties. As shown in the FIG. 9, it is found that the fan motor (thick solid line A) according to the present preferred embodiment has ½ or less vibration acceleration as compared with the conventional fan motor (thin solid line B).

As described above, according to the present preferred embodiment, the stator core is not fixed by an adhesive, welding, caulking, etc., and therefore, assembling and disassembling of the fan can be readily performed. Also, the stator core is structured not to be in direct contact with the sleeve, and therefore, it is possible to decrease vibrations of the stator core, and an axial fan motor having low vibration and low noise can be provided.

Second Preferred Embodiment

Next, a second preferred embodiment of the present invention will be described with reference to FIGS. 10 to 13. In addition, the same reference numerals in the respective drawings denote the same parts.

Figure 10:
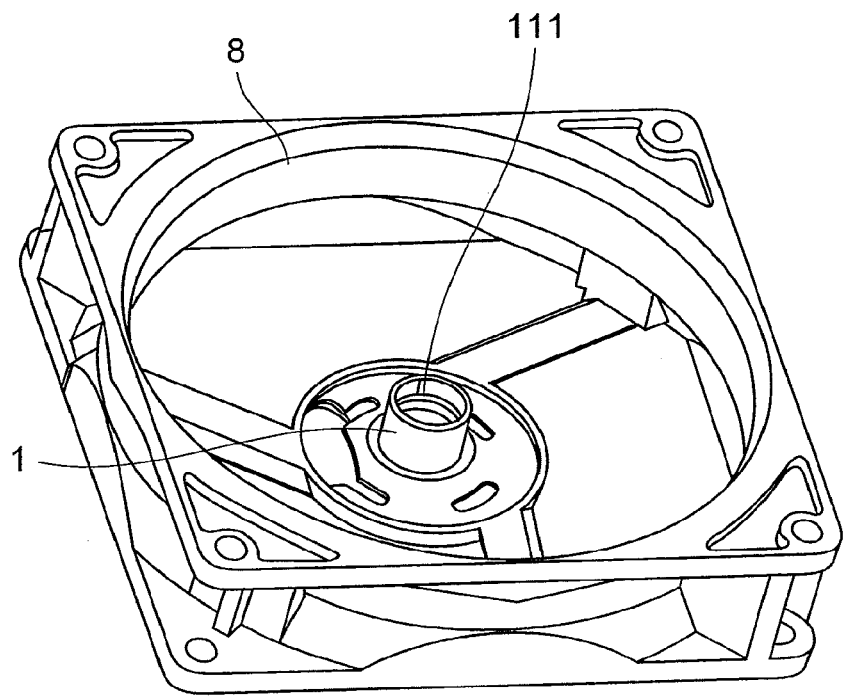
FIG. 10 is a perspective view of a venturi of an axial fan motor according to a second preferred embodiment of the present invention.

FIG. 10 is a perspective view of a venturi. As shown in FIG. 10, an upper end of a sleeve 1 mounted to a central portion of the venturi 8 is circular-shaped and downwardly concave-shaped and is provided on a portion of a circumference thereof with a positioning notch 111. An upper insulator described below is fitted into the circular-shaped recess.

Figure 11:
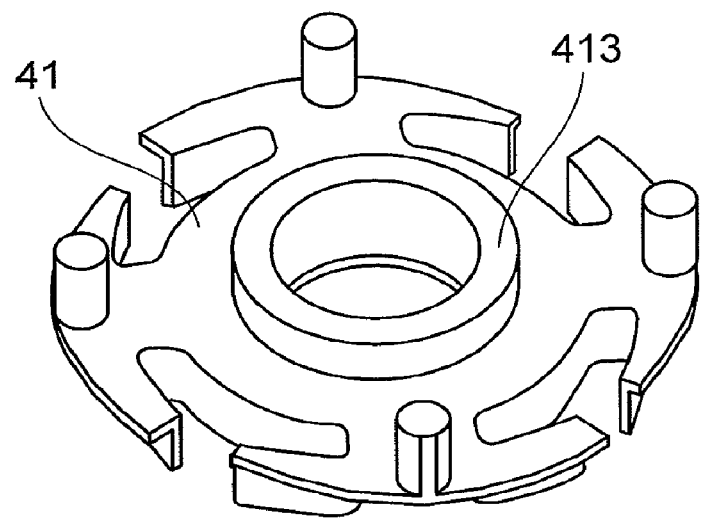
FIG. 11 is a perspective view of an upper insulator of the axial fan motor according to the second preferred embodiment of the present invention.

FIG. 11 is a perspective view of the upper insulator 41. The upper insulator 41 is provided with a bearing support 413. A bearing is fitted inside the bearing support 413.

Figure 12:
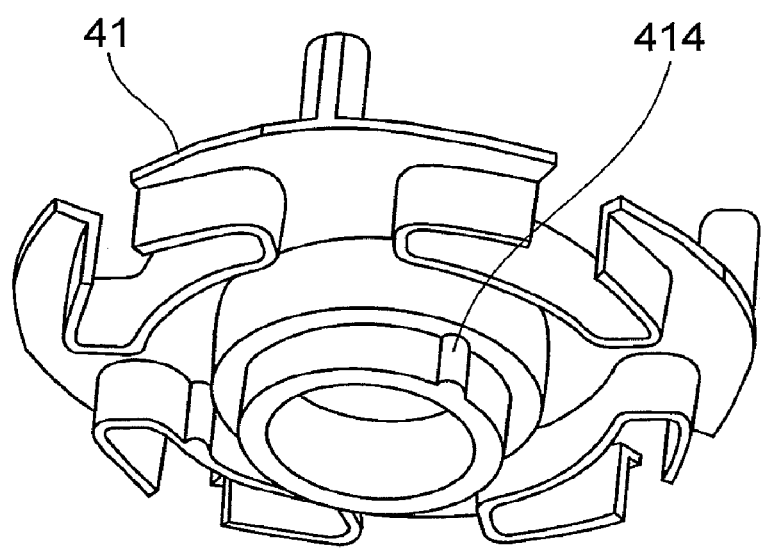
FIG. 12 is a perspective view of the upper insulator of the axial fan motor according to the second preferred embodiment of the present invention, as viewed from below.

FIG. 12 is a perspective view of the upper insulator 41 as viewed from below. As shown in FIG. 12, a positioning projection 414 is mounted to an underside of the upper insulator 41 to be fitted into the notch 111 on the upper portion of the sleeve shown in FIG. 10.

Figure 13:
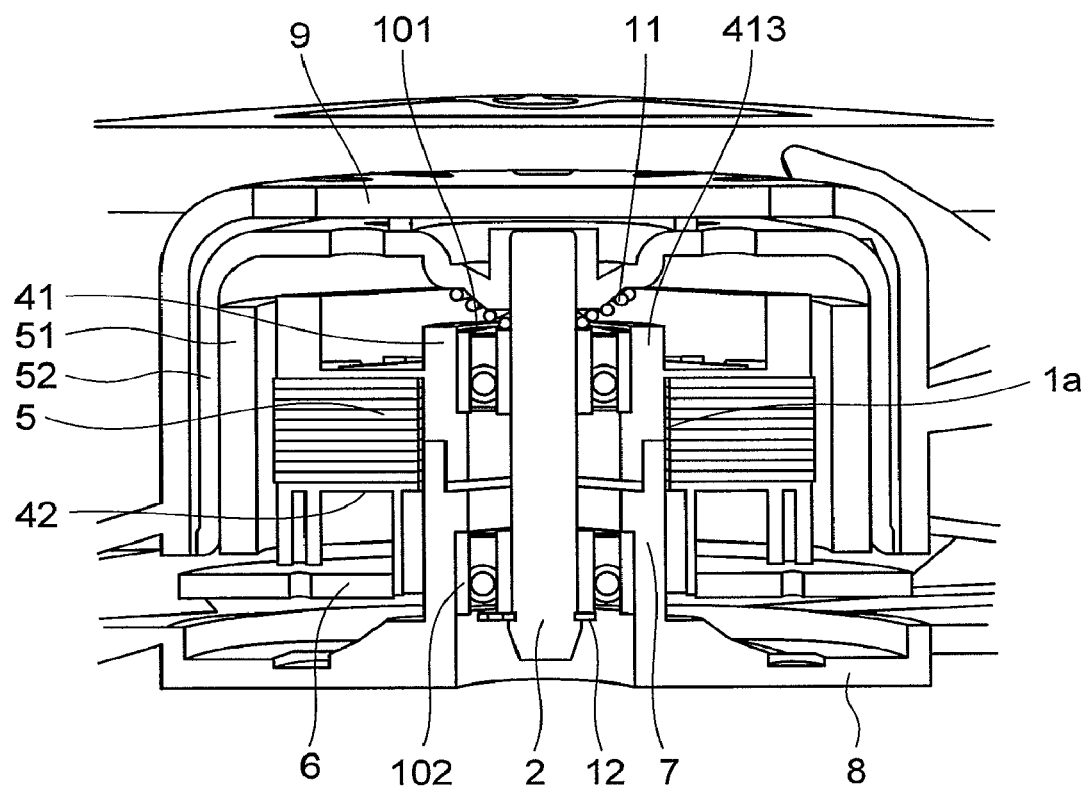
FIG. 13 is a cross-sectional view of the axial fan motor according to the second preferred embodiment of the present invention.

FIG. 13 is a cross-sectional view of a motor portion of a fan motor, in which the present preferred embodiment is used. The procedure of assembling will be described with reference to FIG. 13.

First, a stator substrate set is defined by the upper insulator 41, a stator core 5, a lower insulator 42, and a substrate 6, and is fitted onto the sleeve 1 centrally of the venturi 8. At this time, the projection 414 of the upper insulator 41 shown in FIG. 12 is assembled within the notch 111 on the upper portion of the sleeve 1 shown in FIG. 10 so as to be fitted therein. In addition, a fan, to which a rotor including a magnet 51 and a rotor case 52 is provided, is mounted to an outer periphery opposed to the stator core 5.

Subsequently, the bearing 101 is placed on the bearing support 413 of the upper insulator 41 and the shaft 2 of the hub 9 of the fan is inserted into the bearing 101 with a conical spring 11 therebetween. Finally, the bearing 102 is mounted in the lower portion of the sleeve 1 and retained by a retaining ring 12.

With such a construction, a space 1a is provided between the stator core 5 and the sleeve 1, and therefore, the space 1a prevents vibrations of the stator core 5 from being transmitted directly to the sleeve 1. Also, the upper insulator 41, which holds the bearing 101, and the sleeve, which holds the lower bearing 102, are separate from each other and not completely joined structurally. That is, an area for transmission of vibrations is decreased as compared with the case where they are formed integrally of the same member, and therefore, vibrations generated by the fan can also be reduced.

Also, the sleeve 1 and the stator substrate set are interposed between the upper and lower bearings 101, 102 and joined by the shaft 2 and the retaining ring 12. Therefore, it is unnecessary to use measures such as bonding with an adhesive, welding, so that assembling and disassembling are readily performed and recycling capability is excellent.

Third Preferred Embodiment

Subsequently, a third preferred embodiment of the present invention will be described with reference to FIG. 14 to 18. In addition, the same reference numerals in the respective drawings denote the same parts.

Figure 14:
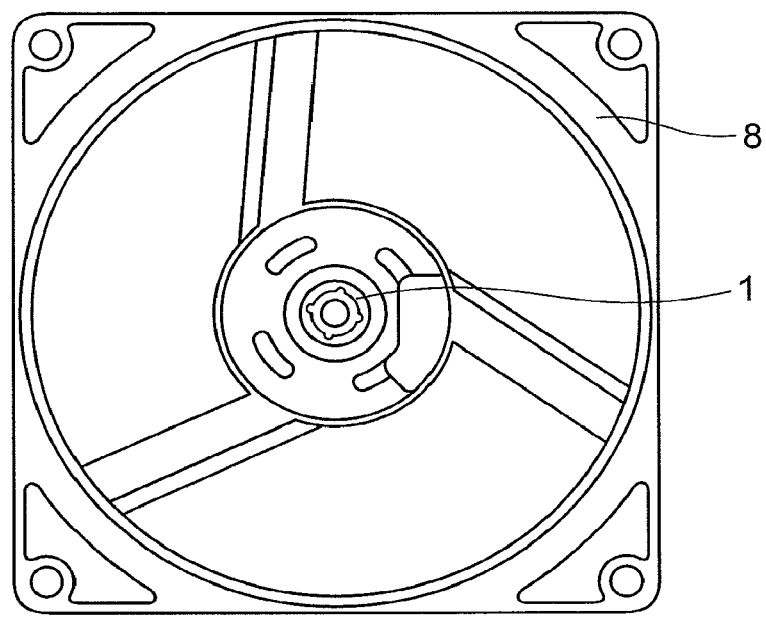
FIG. 14 is a perspective view of a venturi of an axial fan motor according to a third preferred embodiment of the present invention.
Figure 15:
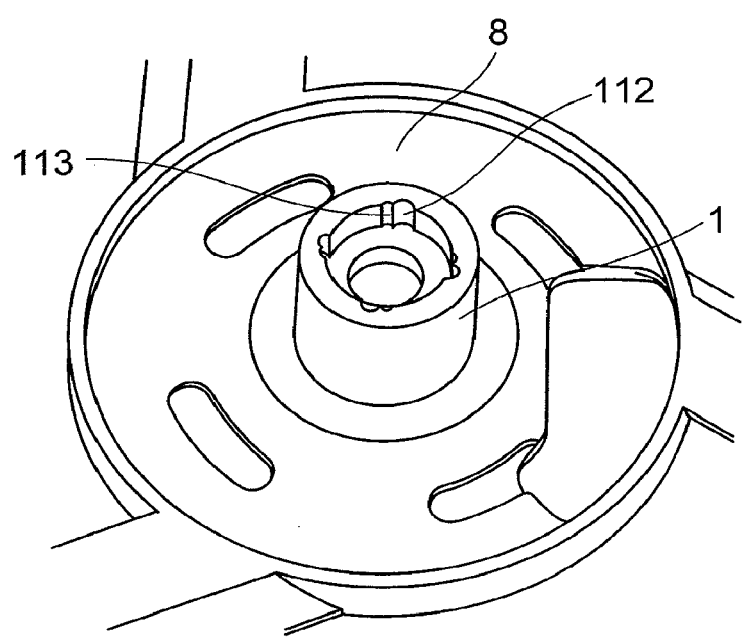
FIG. 15 is an enlarged perspective view showing the vicinity of a sleeve of the axial fan motor according to the third preferred embodiment of the present invention.

FIG. 14 is a perspective view of a venturi. As shown in FIG. 14, an upper end of a sleeve 1 mounted to a central portion of the venturi 8 is circular-shaped and downwardly concave-shaped to include large and small semi-circular notches in eight locations on a circumference thereof. The notches will be described with reference to an enlarged perspective view of FIG. 15, which shows the vicinity of the sleeve 1. As shown in FIG. 15, two kinds of semi-circular notches are shown; passage notches 112 and positioning notches 113 are provided, and the positioning notches 113 have a smaller radius than the radius of the passage notches 112. Two of these notches define a set and are arranged very close to each other, four sets in total being arranged across from each other, that is, about every 90 degrees.

Figure 16:
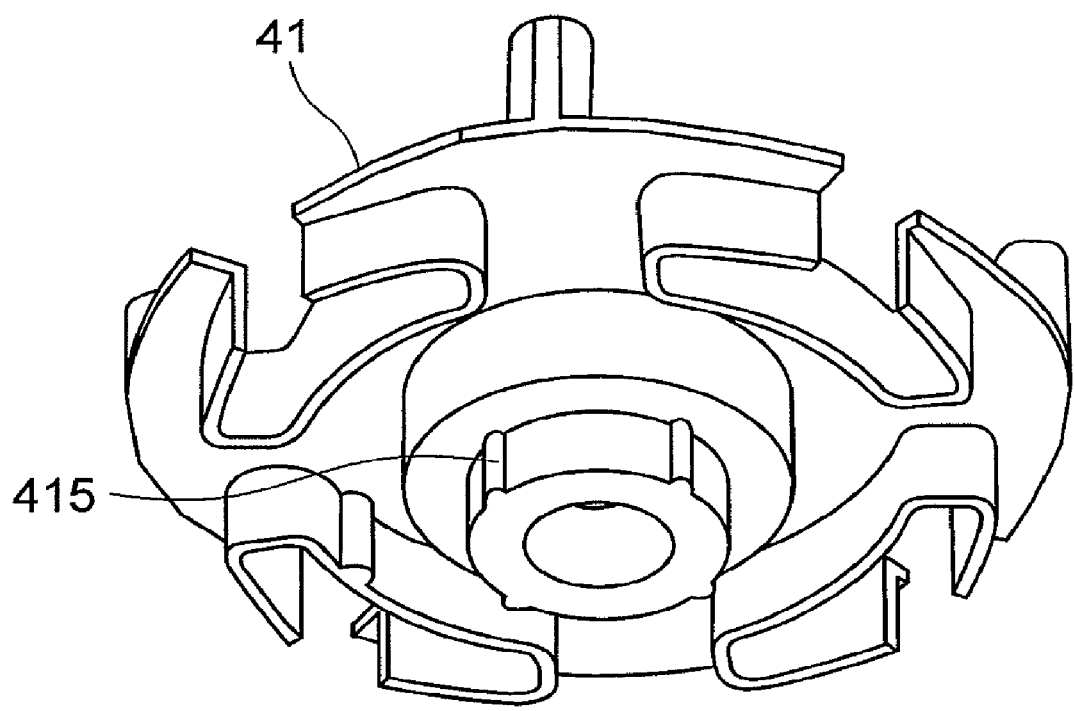
FIG. 16 is a perspective view showing an upper insulator of the axial fan motor according to the third preferred embodiment of the present invention, as viewed from below.

FIG. 16 is a perspective view of the upper insulator 41 as viewed from below. As shown in FIG. 16, positioning projections 415 are mounted to an underside of the upper insulator 41. The upper insulator 41 is fitted into an upper portion of the sleeve 1 as shown in FIG. 15.

Figure 17:
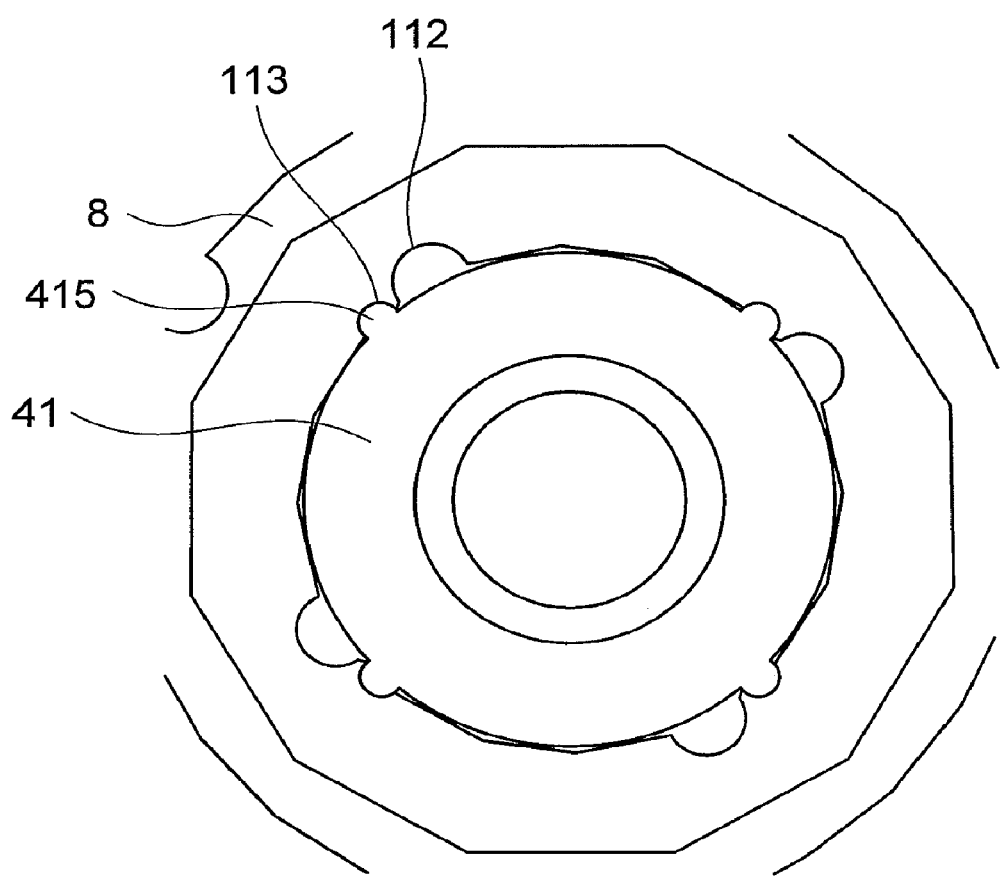
FIG. 17 is a view showing a manner in which the insulator and the sleeve according to the third preferred embodiment of the present invention are joined.

FIG. 17 is a view showing a manner in which the insulator 41 and the sleeve 1 are joined. As shown in FIG. 17, the positioning projections 415 on the upper insulator 41 are first inserted into the passage notches 112 on the sleeve 1, and when all the projections 415 have been inserted, the upper insulator 41 is then rotated counter-clockwise and the projections 415 are fitted into and fixed to the positioning notches 113 on the sleeve 1.

Figure 18:
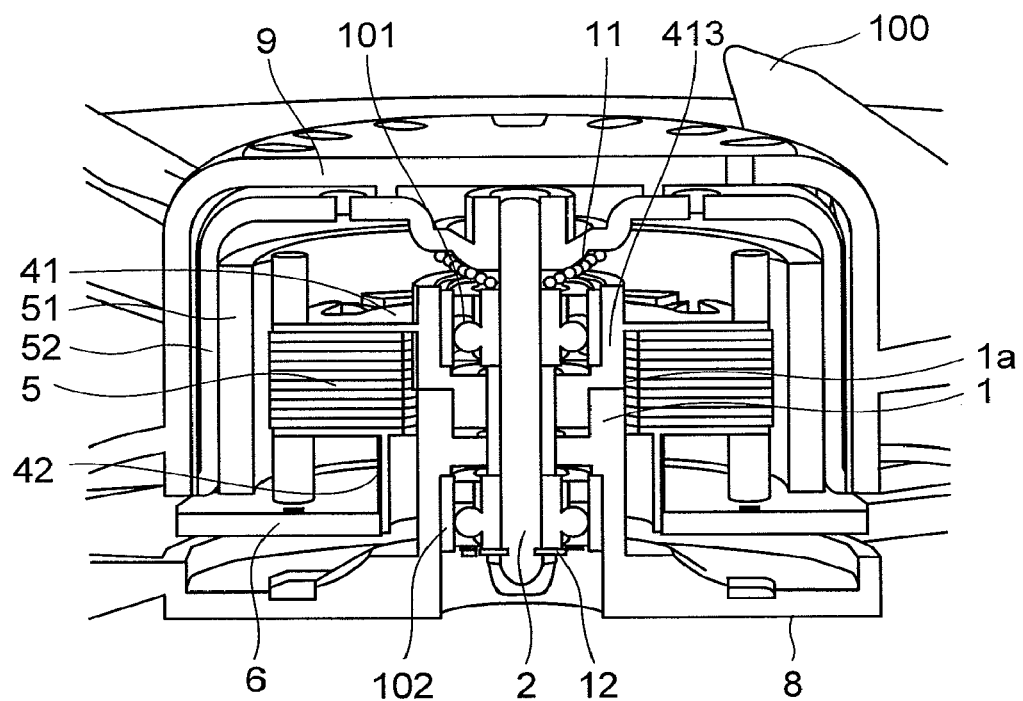
FIG. 18 is a cross-sectional view of the axial fan motor according to the third preferred embodiment of the present invention.

FIG. 18 is a cross-sectional view of a motor portion of a fan motor in which the present preferred embodiment is used. The procedure of assembling will be described with reference to FIG. 18.

First, a stator substrate set defined by the upper insulator 41, the stator core 5, the lower insulator 42, and the substrate 6 is inserted into the sleeve 1 on a central portion of the venturi 8. At this time, assembly is performed so that the projections 415 of the upper insulator 41 shown in FIG. 16 are fitted into the passage notches 112 on the upper portion of the sleeve 1. In addition, a fan, to which a rotor including a magnet 51 and a rotor case 52 is provided, is mounted to an outer periphery opposed to the stator core 5.

Subsequently, as described with reference to FIG. 17, the stator substrate set is rotated counterclockwise and the projections 415 are fitted into and fixed to the positioning notches 113 on the sleeve 1. Since the stator substrate set is rotated in the same direction as a direction (counterclockwise in the present preferred embodiment) of the rotation of the fan and is fixed thereto, it will not rotate in a reverse direction to that at the time of mounting, and therefore will not come off even in the case where the fan is mounted and operated. That is, since a force acts on the stator substrate set in the direction of rotation of the fan but a force does not act thereon in a reverse direction, the stator substrate set will not come off. Subsequently, the bearing 101 is placed on the bearing support 413 of the upper insulator 41 and the shaft 2 of the hub 9 of the fan is inserted into the bearing 101 with a conical spring 11 therebetween. Finally, the bearing 102 is mounted in the lower portion of the sleeve 1 and retained by the retaining ring 12.

With such a construction, since the space 1a is provided between the stator core 5 and the sleeve 1, the space 1a prevents vibrations of the stator core 5 from being transmitted directly to the sleeve 1. Also, the upper insulator 41 which holds the bearing 101, and the sleeve which holds the lower bearing 102, are separate from each other and not completely joined structurally. That is, an area for transmission of vibrations is decreased as compared with the case where they are formed integrally of the same member, and therefore, vibrations generated by the fan can also be reduced.

Also, the sleeve 1 and the stator substrate set are interposed between the upper and lower bearings 101, 102 and joined by the shaft 2 and the retaining ring 12. Therefore, it is unnecessary to use measures such as bonding with an adhesive, welding, so that assembling and disassembling are readily performed and recycling capability is excellent.

Fourth Preferred Embodiment

Subsequently, a fourth preferred embodiment of the present invention will be described with reference to FIGS. 19 to 22. In addition, the same reference numerals in the respective drawings denote the same parts.

Figure 19:
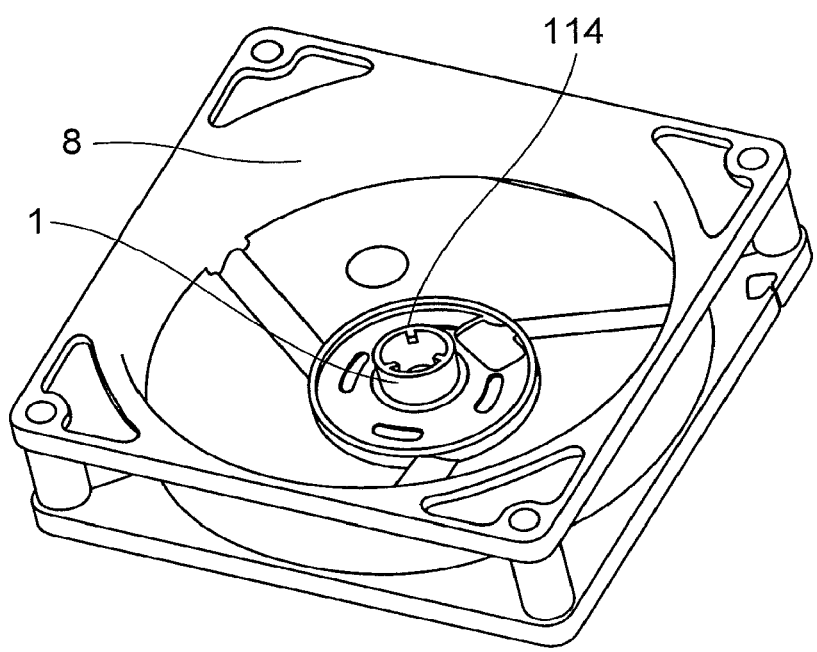
FIG. 19 is a perspective view of a venturi according to a fourth preferred embodiment of the present invention.

FIG. 19 is a perspective view of a venturi. As shown in FIG. 19, an upper end of a sleeve 1 mounted to a central portion of the venturi 8 includes projections 114 in three locations.

Figure 20:
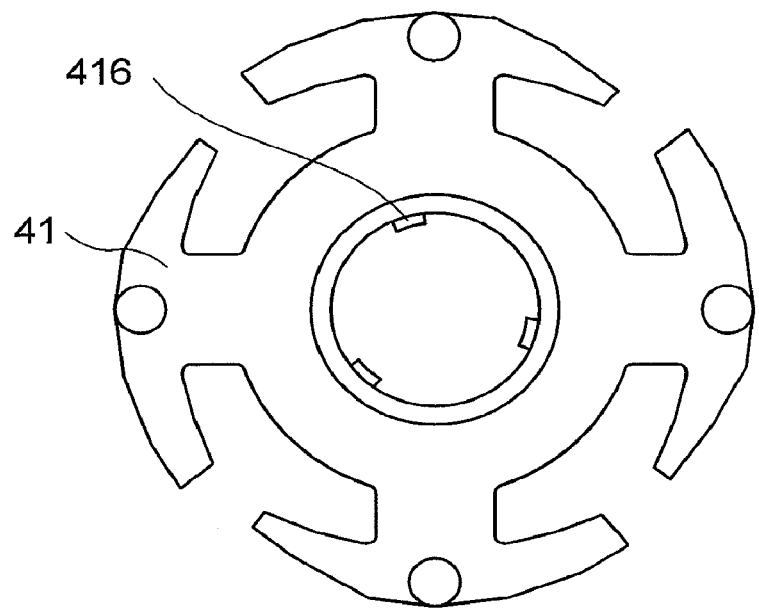
FIG. 20 is a view of the upper insulator according to the fourth preferred embodiment of the present invention, as viewed from above.
Figure 21:
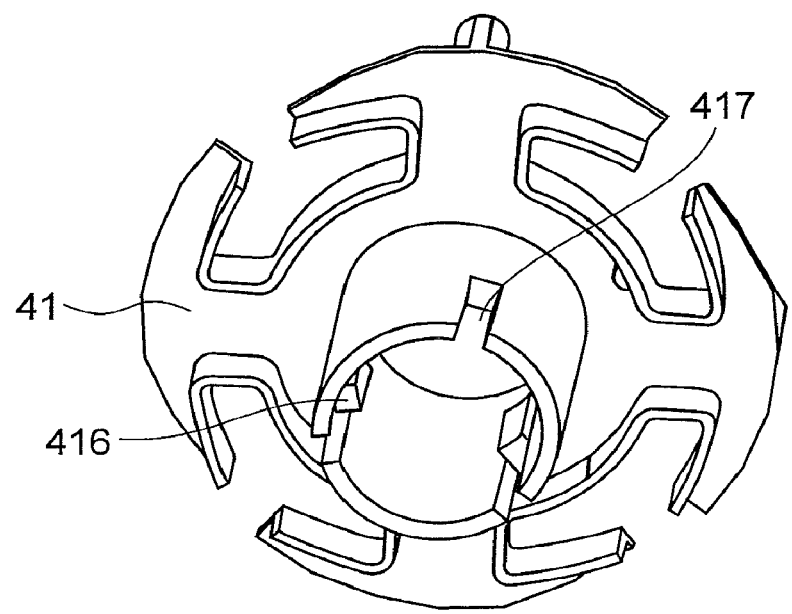
FIG. 21 is a view of the upper insulator according to the fourth preferred embodiment of the present invention, as viewed from below.
Figure 22:
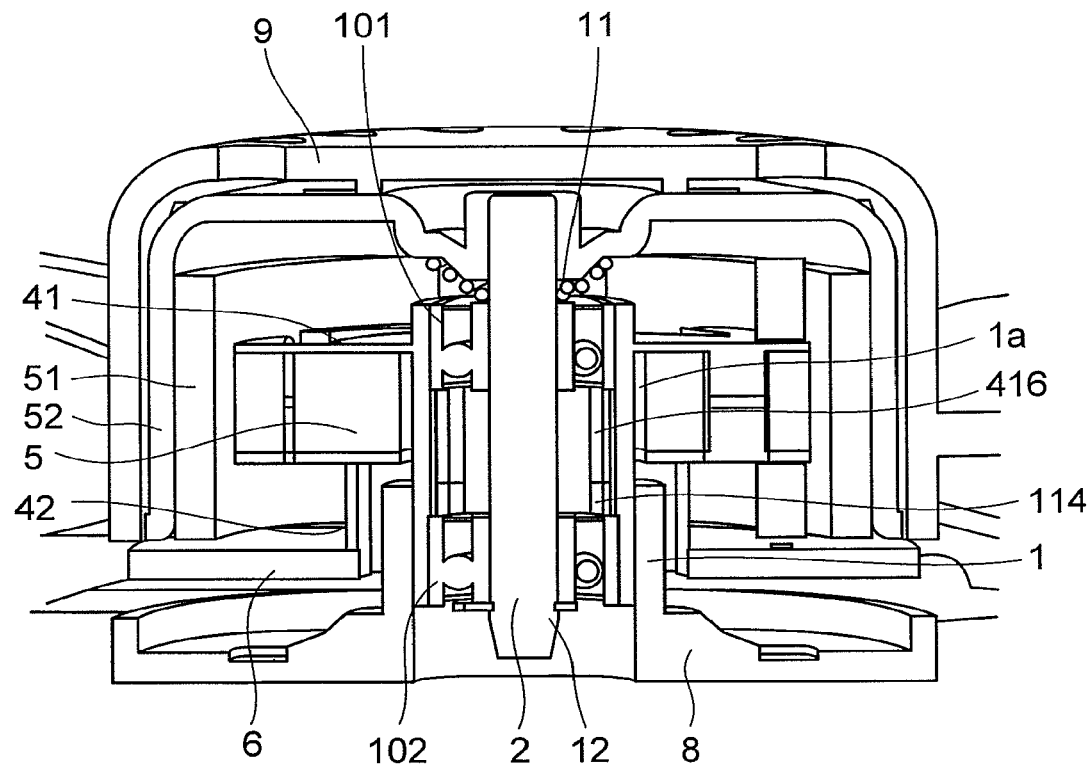
FIG. 22 is a cross-sectional view of a fan motor according to the fourth preferred embodiment of the present invention.

FIG. 20 is a view of an upper insulator 41 as viewed from above and FIG. 21 is a perspective view of the upper insulator 41 as viewed from below. The upper insulator 41 is provided in three locations with bearing supports 416. Bearings are fitted onto upper sides of the bearing supports 416. Also, as shown in FIG. 22, notches 417 are provided in three locations on a lower portion of the upper insulator to be arranged below the bearing supports 416. The projections 114 at the upper end of the sleeve 1 shown in FIG. 19 are fitted into the notches 417.

FIG. 22 is a cross-sectional view of a motor portion of a fan motor in which the present preferred embodiment is used. The assembly procedure will be described with reference to FIG. 22.

First, a stator substrate set defined by the upper insulator 41, a stator core 5, a lower insulator 42, and a substrate 6 is inserted into the sleeve 1 on a central portion of the venturi 8. At this time, assembly is performed so that the projections 114 on the upper portion of the sleeve 1 shown in FIG. 19 are fitted into the notches 417 of the upper insulator 41 shown in FIG. 21. In addition, a fan, to which a rotor including a magnet 51 and a rotor case 52 is provided, is mounted to an outer periphery opposed to the stator core 5.

Subsequently, a bearing 101 is placed on the bearing supports 416 of the upper insulator 41 and a shaft 2 of a hub 9 of the fan is inserted into the bearing 101 with a conical spring 11 therebetween. Finally, a bearing 102 is mounted in a lower portion of the sleeve 1 and retained by a retaining ring 12.

With such a construction, a space 1a is provided between the stator core 5 and the sleeve 1, and therefore, the space 1a prevents vibrations of the stator core 5 from being transmitted directly to the sleeve. Also, the upper insulator 41, which holds the bearing 101, and the sleeve, which holds the lower bearing 102, are separate from each other and not completely joined structurally. That is, an area for transmission of vibrations is decreased as compared with the case where they are formed integrally of the same member, and therefore, vibrations generated by the fan can also be reduced.

Also, since the sleeve 1 and the stator substrate set are interposed between the upper and lower bearings 101, 102 and joined by the shaft 2 and the retaining ring 12, it is unnecessary to use measures such as bonding with an adhesive, welding, so that assembling and disassembling are readily performed and recycling capability is excellent.

Fifth Preferred Embodiment

Figure 23:
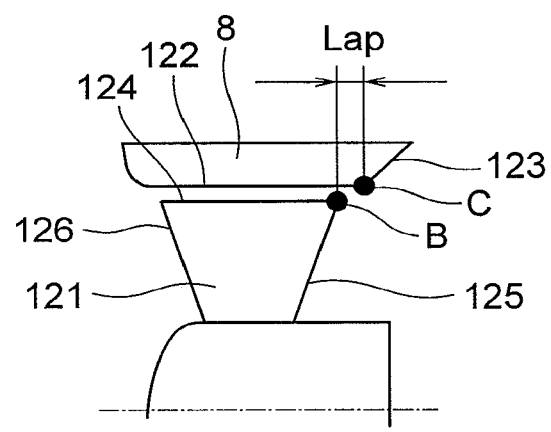
FIG. 23 is a cross-sectional view of a meridian plane of a fan according to a fifth preferred embodiment of the present invention.

Subsequently, a fifth preferred embodiment of the present invention will be described with reference to FIG. 23. FIG. 23 is a cross-sectional view of a meridian plane of a fan of an axial fan motor according to the fifth preferred embodiment. The reference numeral 121 denotes one vane of the fan 100 shown in FIG. 3, 122 an inner cylindrical portion of a venturi 8, and C a boundary of the cylindrical portion 122 and an enlarged portion 123. A distance between a point B of intersection of a tip 124 and a trailing edge 125 of a vane 121 and the boundary C is defined as Lap. The trailing edge 125 of the vane does not overlap a side of the enlarged portion 123 and the cylindrical portion 122 covers the entire fan 100 such that Lap >0. In addition, the reference numeral 126 denotes a leading edge of the vane 121.

Such a construction eliminates interference between a vane tip vortex, which is discharged from a clearance between the tip 124 and the cylindrical portion 122, and the enlarged portion 123. Thereby, it is possible to suppress non-uniformity of the flow on a discharge side and to reduce noise generated upon rotation of the fan 100. Further, when Lap is made greater than zero, a straight portion of the inner cylindrical portion 122 of the venturi 8 is lengthened, so that the venturi 8 is improved as a whole in stiffness, thus enabling reduced vibrations.

Sixth Preferred Embodiment

Subsequently, a sixth preferred embodiment of the present invention will be described with reference to FIGS. 24 and 25. In addition, the same reference numerals in the respective drawings denote the same parts.

Figure 24:
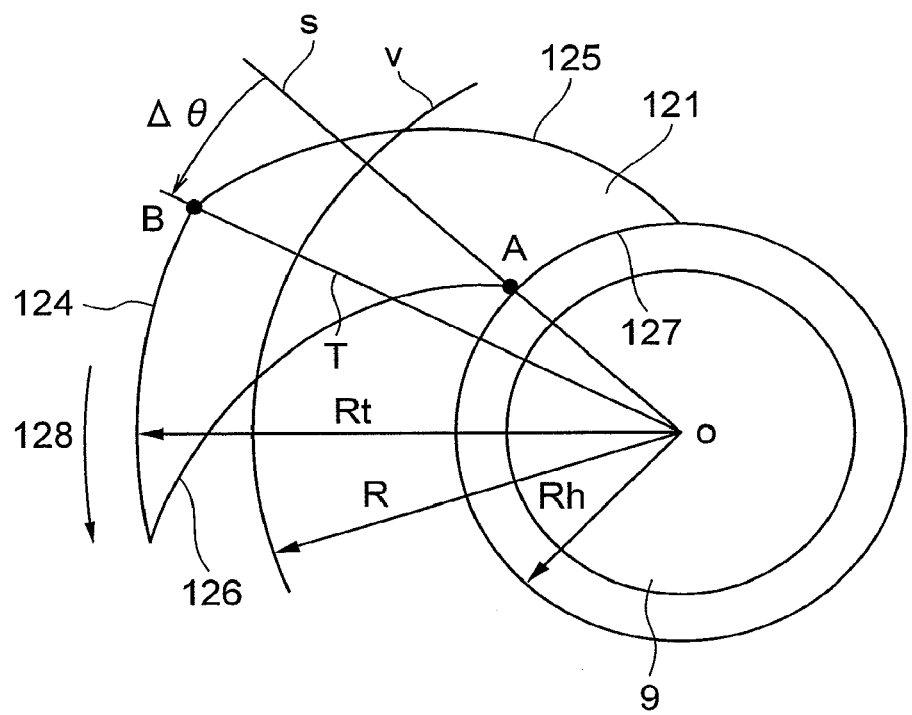
FIG. 24 is a plan view of an impeller of a fan according to a sixth preferred embodiment of the present invention, as viewed from an air intake side.

FIG. 24 is a plan view of a fan of an axial fan motor according to the sixth preferred embodiment as viewed from an air intake side. The reference numeral 121 denotes a vane, 9 a hub, 126 a leading edge of the vane, 125 a trailing edge of the vane, 124 a tip of the vane, 127 a boundary of the vane and the hub (referred below to as hub portion), and 128 a direction of rotation of an impeller. A plurality of the vanes 121 are arranged around the hub 9.

A indicates a point of intersection of the leading edge 125 and the hub portion 127, B a point of intersection of the trailing edge 126 and the tip 124, S a straight line connecting the point A of intersection and a center O of rotation of the fan, and T a straight line connecting the point B of intersection and the center O of rotation of the fan. It is determined that AO is greater than zero where $\Delta\theta$ indicates an angle formed between the straight line S and the straight line T and a direction 128 of rotation is defined to be positive. In addition, $\Delta\theta$ is preferably about 20 degrees in the present preferred embodiment of FIG. 24, for example. In this manner, the fan is shaped such that $\Delta\theta$ is positive, that is, the vanes 121 overhang in the direction of rotation.

Figure 25:
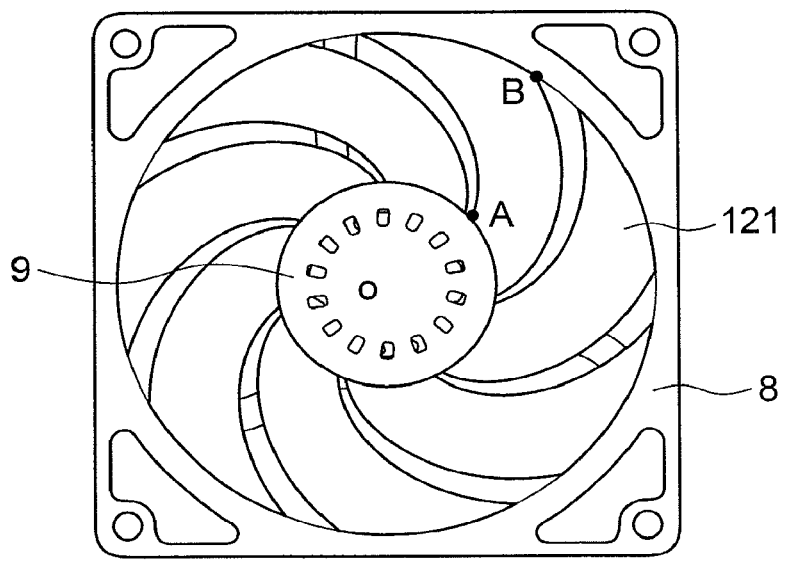
FIG. 25 is a plan view of an axial fan motor according to the sixth preferred embodiment of the present invention.

FIG. 25 is an axial fan motor, on which the fan shown in FIG. 24 is mounted. The reference numeral 8 denotes a venturi, 121 a vane, and 9 a hub. The stator substrate set according to any one of the first to fourth preferred embodiments is mounted on the venturi 8, and the vanes 121 and the venturi 8 have the relationship according to the fifth preferred embodiment. Such a combination of the fan, the venturi, and the stator substrate set can reduce vibrations by the motor and fluid noise generated from the fan and can achieve an improvement in fluid performance by making the overhang of the vanes 121 larger as shown in FIG. 24.

As described above, since preferred embodiments of the present invention are constructed such that the motor stator core and the sleeve do not come into contact directly with each other and vibration of the stator core is attenuated from reaching the sleeve, it is possible to reduce vibrations of the fan. Due to such vibration reductions of the fan, OA/IT equipment and household electric appliances, on which the fan may be incorporated and mounted, can be made to have low vibrations and noise. Also, since the stator core and the sleeve are not firmly in direct contact with each other by welding, an adhesive material, or the like, disassembling can be readily performed. Therefore, recycling of the stator core, the venturi, etc. when disassembled becomes possible.

Seventh Preferred Embodiment

A fan according to a seventh preferred embodiment is now described referring to FIGS. 26 to 34D.

Figure 26:
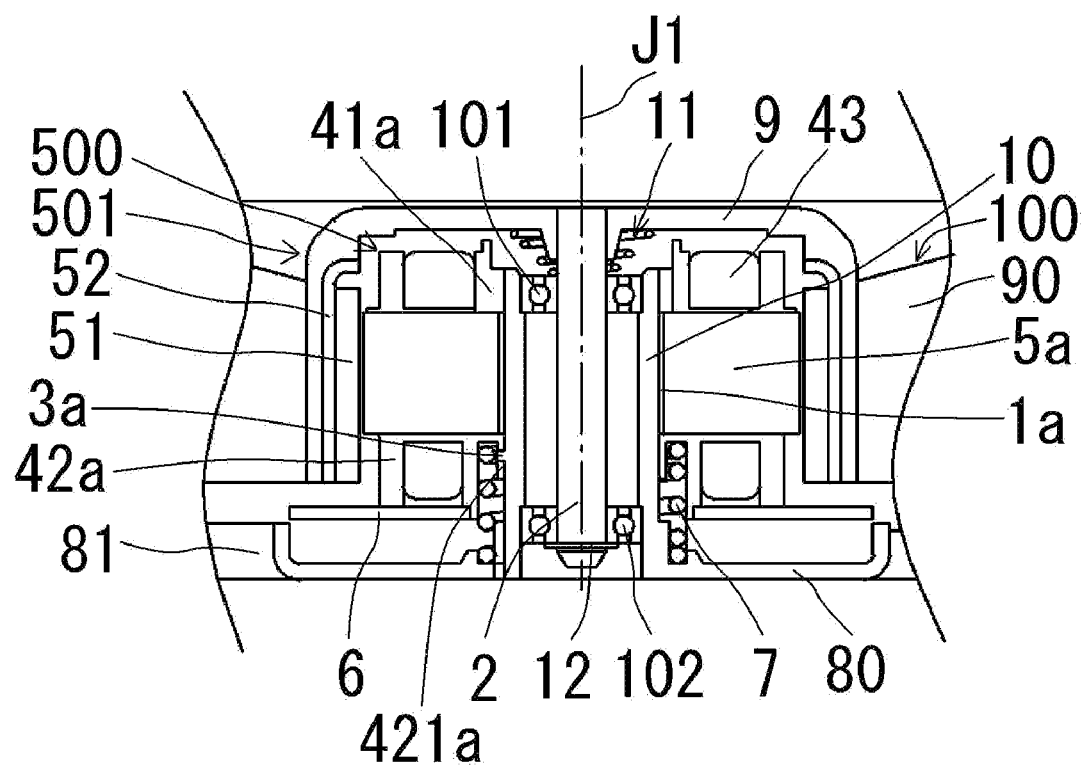
FIG. 26 is a cross-sectional view of a fan according to a seventh preferred embodiment of the present invention.
Figure 27:
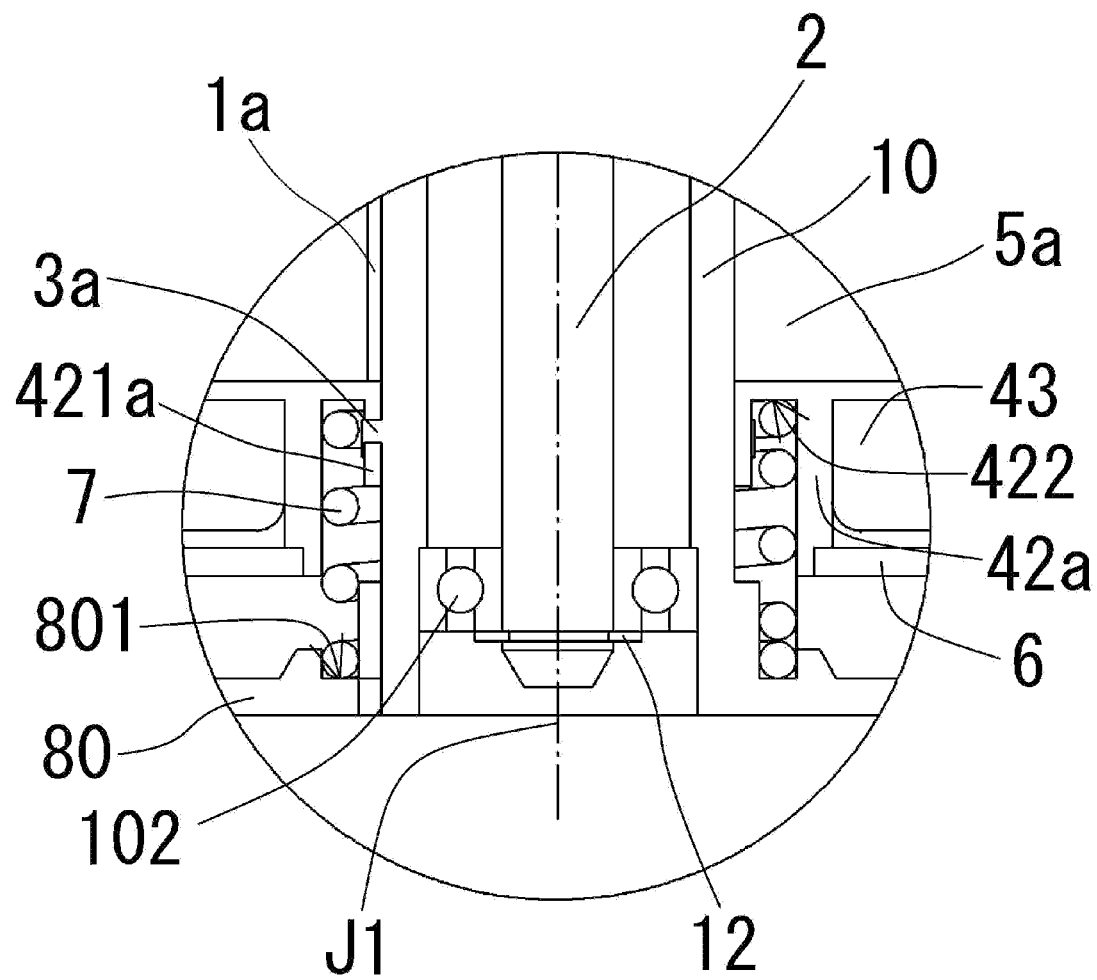
FIG. 27 is an enlarged view of an armature supporting portion of the fan of the seventh preferred embodiment of the present invention.
Figure 28:
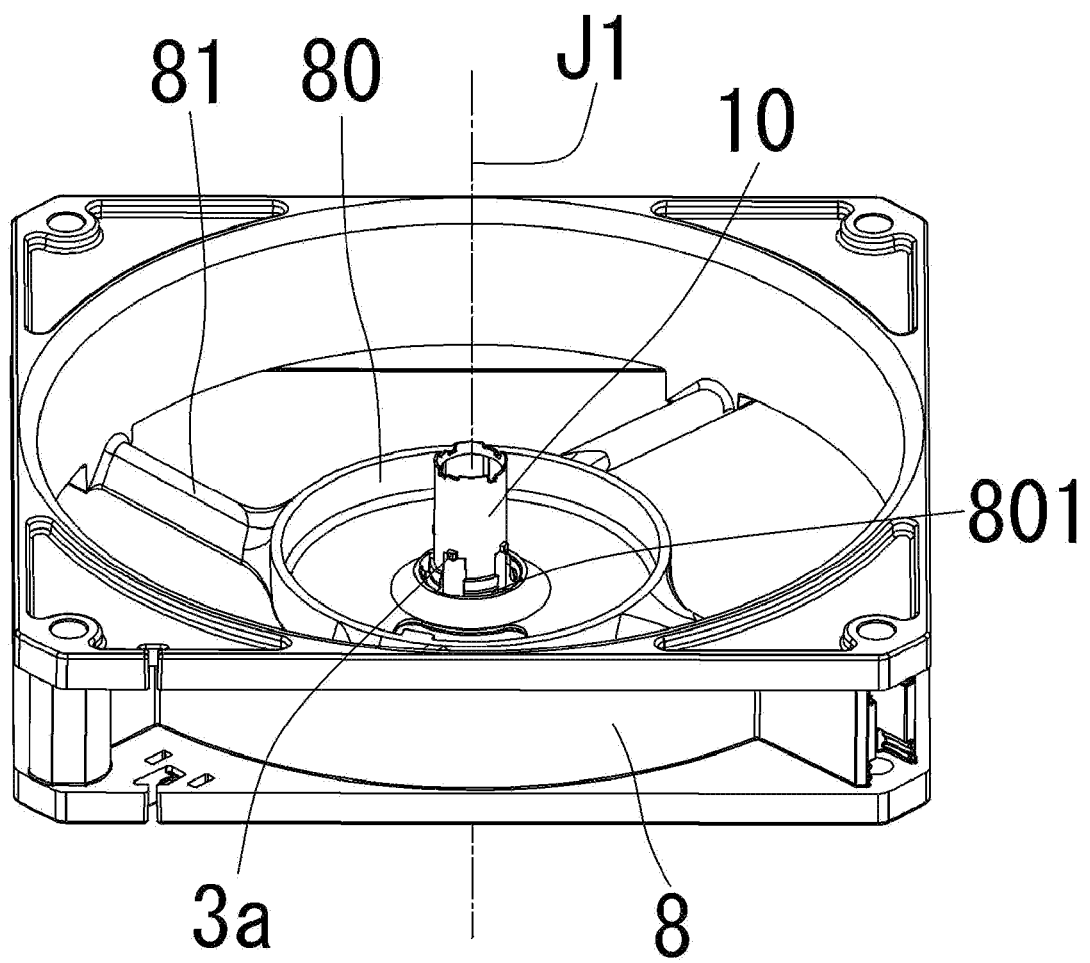
FIG. 28 is a perspective view of a housing including a bearing holder in the fan of the seventh preferred embodiment of the present invention.
Figure 29:
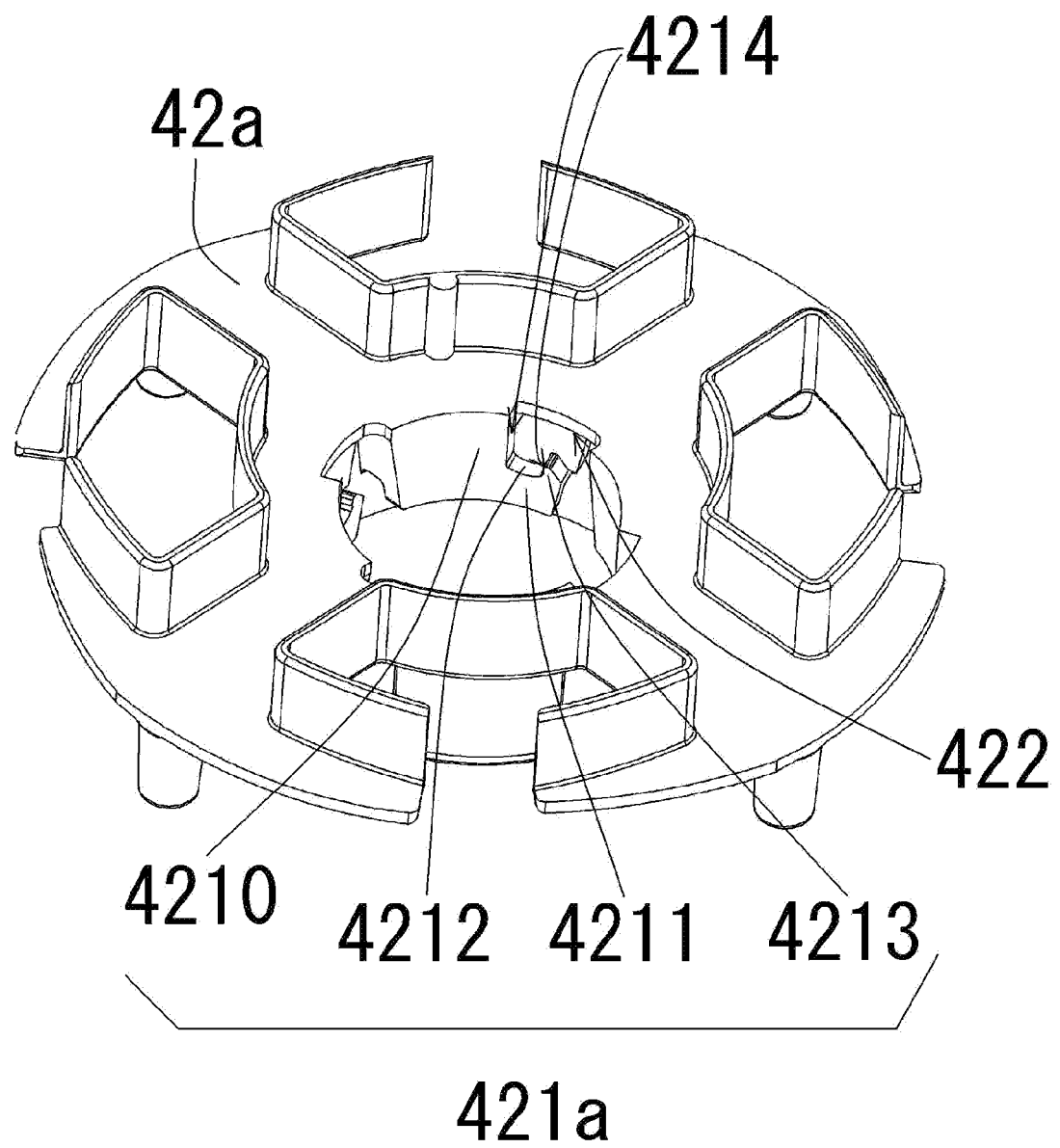
FIG. 29 is a perspective view of a lower insulator of the fan of the seventh preferred embodiment of the present invention.

FIG. 26 is a cross-sectional view of the fan A according to the seventh preferred embodiment taken along a plane including its center axis J1. FIG. 27 is an enlarged view of an armature supporting portion in FIG. 26. FIG. 28 is a perspective view of a housing including a bearing holder. FIG. 29 is a perspective view of a lower insulator of the present preferred embodiment.

The fan A in the present preferred embodiment is an axial fan which creates an axial air flow, for example. Referring to FIG. 26, the axial fan A includes an impeller 100 which creates an air flow while rotating, and a motor unit connected to the impeller 100 to rotate the impeller 100 about the center axis J1. The motor portion is secured to a base portion 80.

The axial fan A includes a housing 8 surrounding the outer periphery of the impeller 100. The housing 8 defines a path for the air flow created by rotation of the impeller 100 by its inner peripheral surface. When air flows through the path, energy of the air flow is converted into static-pressure energy.

A plurality of ribs 81 are connected at their radially inner ends to the outer peripheral surface of the base portion 80. The ribs 81 extend radially outward and are arranged about the center axis J1 at regular circumferential intervals. The ribs 81 are also connected at their radially outer ends to the inner peripheral surface of the housing 8. With this configuration, the base portion 80 is supported by the housing 8.

A bearing holder 10 is fixed substantially at the center of the base portion 80. The bearing holder 10 is arranged coaxially with the axis of rotation of the impeller 100, i.e., the center axis J1. In the present preferred embodiment, the bearing holder 10 is hollow and arranged approximately cylindrically about the center axis J1. An armature 500 is supported on the outer side surface of the bearing holder 10, while at least one bearing member is supported on the inner side surface of the bearing holder 10. In the present preferred embodiment, a pair of ball bearings 101 and 102 preferably is used as the bearing members. A shaft 2 is arranged at the center of the bearing member substantially coaxially with the center axis J1. The shaft 2 is inserted between the ball bearings 101, 102 in the present preferred embodiment, as shown in FIG. 26.

The axial fan A uses an outer rotor type motor in which a rotor magnet 51 is arranged radially outside the armature 500. In the present preferred embodiment, the motor includes a rotor portion 501 as a rotating assembly, and a stator portion and the bearing member define a stationary portion. The rotor portion 501 is supported by the bearing member in a rotatable manner relative to the stator portion. The configuration and arrangement of the bearing member will be described below.

The stator portion is secured to the outer side surface of the bearing holder 10 which accommodates the bearing member therein. The stator portion includes the armature 500 and a circuit board 6 as main components. The armature 500 includes a stator core 5a, an upper insulator 41a, a lower insulator 42a, and coil windings 43.

The stator core 5a is defined by a plurality of stacked stator plates. In the present preferred embodiment, each stator plate is a thin plate made of magnetic material, for example. In addition, the stator core 5a has four magnetic poles. This is because in axial fans used for cooling electronic devices like the axial fan A of the present preferred embodiment, single-phase bipolar driving or two-phase unipolar driving is performed, and a stator core for these driving methods typically includes four magnetic poles. More specifically, the stator core 5a has a core back portion which is approximately annular in shape and has four magnetic poles (teeth). The teeth are arranged about the center axis J1 in a circumferential direction of the core back portion and extend from the outer periphery of the core back portion outward in a radial direction substantially perpendicular to the center axis J1. In the present preferred embodiment, the teeth and the core back portion are integral with each other to define a single unit made from the same material.

The stator core 5a is covered by the upper and lower insulators 41a and 42a except for its outer side surface and inner side surface. The upper insulator 41a covers the stator core 5a from above, while the lower insulator 42a covers the stator core 5a from below. The coil windings 43 are wound around the teeth of the stator core 5a by winding copper wire around the teeth with the upper and lower insulators 41a and 42a interposed therebetween.

The circuit board 6 is arranged below the stator core 5a and is preferably connected to the lower insulator portion 42a. The circuit board 6 preferably includes a printed board and at least one circuit component. The printed board is provided with a conductive pattern printed thereon so that a control circuit can be created by mounting at least one circuit component thereon. For example, the conductive pattern may be formed by copper foil. On the board is mounted at least one circuit component. An end of the copper wire forming the control circuit is electrically connected to the coil windings 43.

The rotor portion 501 includes an impeller 100, a rotor magnet 51, a rotor yoke 52, and the shaft 2. The impeller 100 includes a hub 9 and a plurality of blades 90 arranged around the hub 9. In the present preferred embodiment, the hub 9 is approximately cylindrical about the center axis J1 and is open at least an axially lower end.

At the center of the hub 9, the upper end of the shaft 2 is fixed so that the shaft 2 extends coaxially with the center axis J1. The impeller 100 rotates the shaft 2 about the center axis J1. On the inner side surface of the hub 9 is fixed the rotor yoke 52 which is approximately cylindrical in the present preferred embodiment. The rotor magnet 51, which is approximately annular in shape in the present preferred embodiment, is fixed to the inner side surface of the rotor yoke 52. The rotor magnet 51 is magnetized in such a manner that a plurality of magnetic poles are alternately arranged in the circumferential direction thereof. The rotor yoke 52 is made of magnetic material. Due to the presence of the rotor yoke 52, a magnetic field generated by the rotor magnet 51 can be prevented from leaking from the axial fan A to the outside. The rotor magnet 51 is opposed to the outer side surface of the stator core 5a in the radial direction. Thus, when a current is supplied to the circuit board 6 from an external power supply, a magnetic field is generated around the stator core 5a and interacts with the magnetic field generated by the rotor magnet 51, thereby generating a torque centered about the center axis J1. This torque rotates the impeller 100 about the center axis J1.

The configuration and arrangement of the bearing member is now described. The shaft 2 is fixed at its upper end to the hub 9 and extends from the hub 9 downward in the axial direction, as described above. The ball bearings 101 and 102 as the bearing members are fixed to the inner side surface of the bearing holder 10. The shaft 2 is inserted between the ball bearings 101, 102, thereby being supported in a rotatable manner relative to the bearing holder 10. Near the upper end of the shaft 2, a preloaded spring 11 is arranged axially above the ball bearing 101. Near the lower end of the shaft 2, a shaft retaining member 12 is provided for preventing egress of the shaft 2 from the ball bearing 102. Since the preloaded spring 11 is arranged to be displaceable in the axial direction, a preload is applied to the ball bearings 101 and 102 by the preloaded spring 11. Thus, the ball bearings 101 and 102 and the shaft 2 are held in position with respect to the bearing holder 10. Moreover, the use of the ball bearing with a preloaded application can provide a satisfactory level of precision of rotation in a stable manner. It should be noted that the bearing member is not limited to a ball bearing although a ball bearing is used in the present preferred embodiment. Another exemplary bearing member is a sliding bearing.

Next, the supporting structure for the bearing holder 10 is described in detail. The armature 500 is provided with the supporting structure.

Referring to FIG. 27, the base portion 80 is provided with a groove 801 near the boundary between the base portion 80 and the bearing holder 10. The groove 801 is preferably substantially annularly shaped in the present preferred embodiment. In the groove 801, a helical coil spring 7 is arranged. The coil spring 7 extends upward in the axial direction along the outer side surface of the bearing holder 10. The upper end of the coil spring 7 is in contact with a coil-spring supporting portion 422 which is also preferably a portion of the lower insulator 42. A distance between the coil-spring supporting portion 422 and the inner bottom surface of the groove 801 is shorter than the natural length of the coil spring 7. In this description, the natural length of the coil spring 7 is a length when no pressure is applied to the coil spring 7. Thus, when the coil spring 7 is arranged between the coil-spring supporting portion 422 and the inner bottom surface of the groove 801, a pressure is applied to the coil spring 7. Thus, the coil spring 7 presses the armature 500 upward in the axial direction.

Referring to FIG. 28, the outer side surface of the bearing holder 10 is provided with at least one projection 3a which projects outward in the radial direction. In the present preferred embodiment, four projections 3a, for example, preferably are circumferentially arranged at regular intervals. The projections 3a are arranged on the outer side surface of the bearing holder 10, and are preferably formed from resin or plastic integrally with each other by injection molding, for example. Alternatively, in a case where a metal bearing holder 10b is formed by pressing (see FIG. 31), at least one projection 421a may be provided by flanging the lower end of the bearing holder 10b so that the projection 421a projects radially outward. In addition, the lower insulator 42a is preferably provided with at least one hook-shaped positioning portion 421a radially inside the coil-spring supporting portion 422. The hook-shaped positioning portion 421a projects downward in the axial direction. In the present preferred embodiment, four positioning portions 421a, for example, preferably are provided at regular circumferential intervals so as to correspond to the aforementioned projections 3a, respectively. The detailed configuration of the positioning portion 421a will be described below.

As described above, the armature 500 is pressed by the coil spring 7 upward in the axial direction with a certain level of pressure. At the same time, the positioning portions 421a press the projections 3a (or the projection 3b in the example of FIG. 31) upward in the axial direction.

The details of the positioning portion 421a are now described. Referring to FIG. 29, the positioning portion 421a includes a base 4210 projecting from the lower insulator 42a toward the center axis J1, an extended portion 4211 which extends from the base 4210 in the circumferential direction, and a protrusion 4213 axially projecting from an opposite end of the extended portion 4211 toward the base 4210. The projection 3a is received between the base 4210 and the protrusion 4213. The top surface of the extended portion 4211 in the axial direction between the protrusion 4213 and the base 4210 is to be in contact with the projection 3a, thereby serving as an axially positioning surface 4212. The protrusion 4213 side surface of the base 4210 and the base 4210 side surface of the protrusion 4213, which are opposed to each other, restrict circumferential movement of the projection 3a received between the base 4210 and the protrusion 4213. Hereinafter, the side surfaces of the base 4210 and the protrusion 4213 are referred to as the side surfaces 4214. A distance between the side surfaces 4214 is larger than the circumferential size of the projection 3a, to compensate for a dimensional error or the like that may occur during manufacturing of the components. Otherwise, it is difficult for the projection 3a to come into axial contact with the axially positioning surface 4212 and therefore the reliability of axial positioning precision is lowered.

With this configuration, vibration of the armature 500 generated while the rotor portion is rotating can be absorbed by the coil spring 7, wherein transfer of vibrations to the bearing holder 10 is reduced. This results in a reduction of vibration of the entire axial fan A.

Moreover, the circuit board 6 is connected to the lower insulator 42a as described above, and is provided with a magnetic sensor. In the present preferred embodiment, a Hall element is mounted on the circuit board 6. The magnetic sensor detects a change in magnetic fluxes of the rotor magnet 51 of the rotor portion and therefore a distance thereof from the rotor magnet 51 in the axial direction has to be kept substantially constant. In the configuration of the axial fan A of the present preferred embodiment, since the lower insulator 42a is positioned relative to the bearing holder 10 by the positioning portion 421a of the lower insulator 42a, the axial position of the circuit board 6 relative to the bearing holder 10, i.e., the position of the magnetic sensor can be substantially the same. Alternatively, the armature 500 can be positioned relative to the bearing holder 10 by the stator core 5a or the upper insulator 41a, instead of the lower insulator 42a. However, it is more preferable to position the circuit board 6 by the lower insulator portion 42a which directly supports the circuit board 6, considering the tolerances of the components.

Figure 30A:
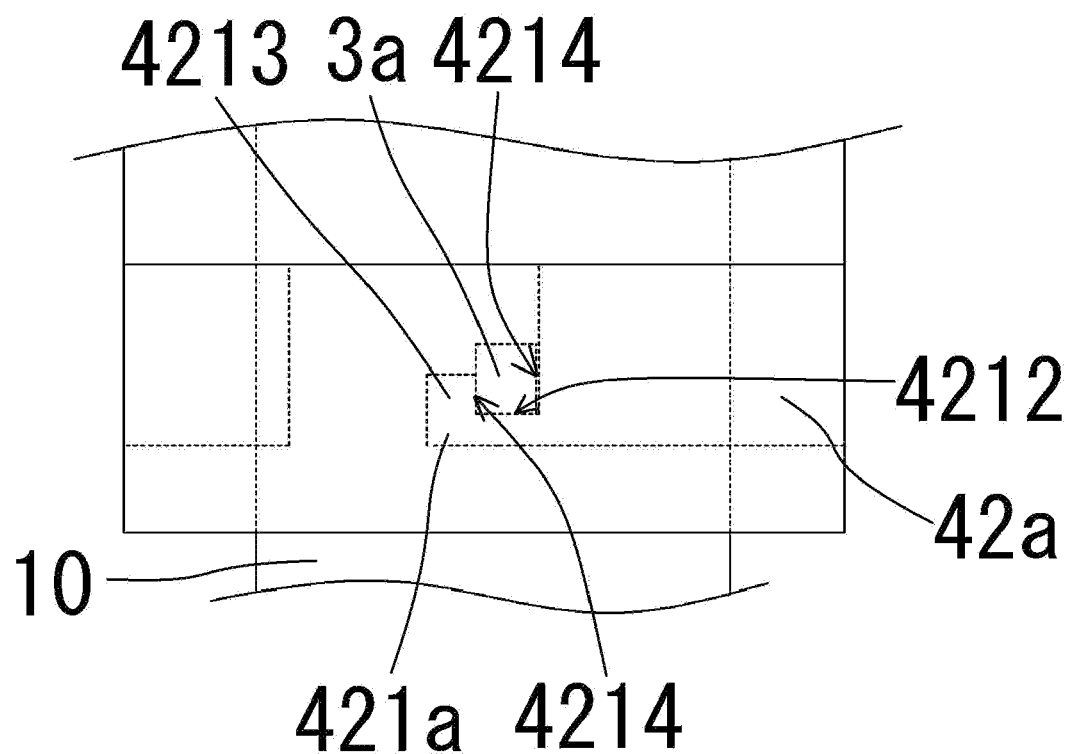
FIGS. 30A to 30D show details of an exemplary process of detaching an armature from the bearing holder in the fan according to the seventh preferred embodiment of the present invention.

Next, how to detach the armature 500 from the bearing holder 10 is described referring to FIGS. 30A to 30D. FIGS. 30A to 30D show details of an exemplary procedure of detaching the armature 500 from the bearing holder 10. FIG. 30A shows a state where the armature 500 is positioned relative to the bearing holder 10. The axially positioning surface 4212 is pressed against the projection 3a by the coil spring 7 wherein the armature 500 is supported. Thus, in the axial fan A of the present preferred embodiment, the armature 500 is hard to move from the bearing holder 10 unless an external force larger than a predetermined level is applied to the armature 500.

Figure 30B:
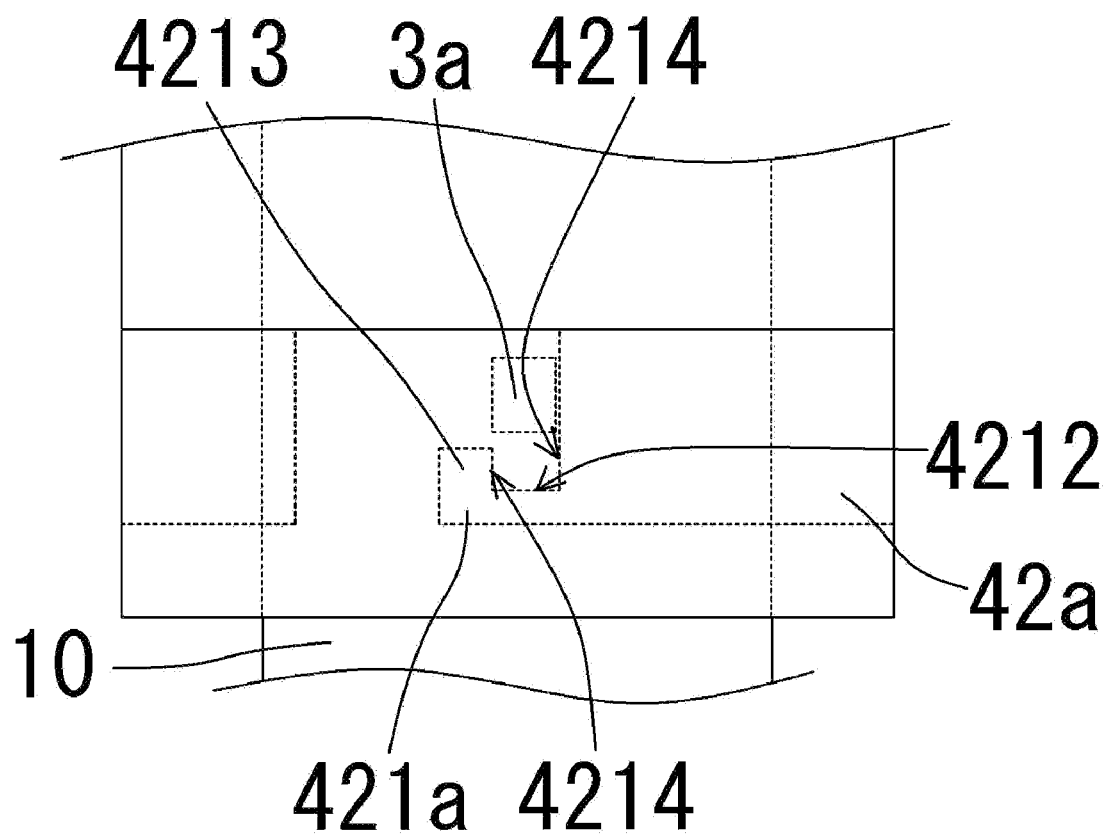

When an external force is applied to the armature 500 so as to move the armature 500 relative to the bearing holder 10 downward in the axial direction, the projection 3a is moved away from the axially positioning surface 4212, as shown in FIG. 30B. Thus, restriction of the axial and circumferential movement of the armature 500 relative to the bearing holder 10 is released. In this state, the projection 3*a* and one of the side surfaces 4214 do not overlap with each other as shown in FIG. 30B, and so the armature 500 can be rotated relative to the bearing holder 10 in one circumferential direction.

Figure 30C:
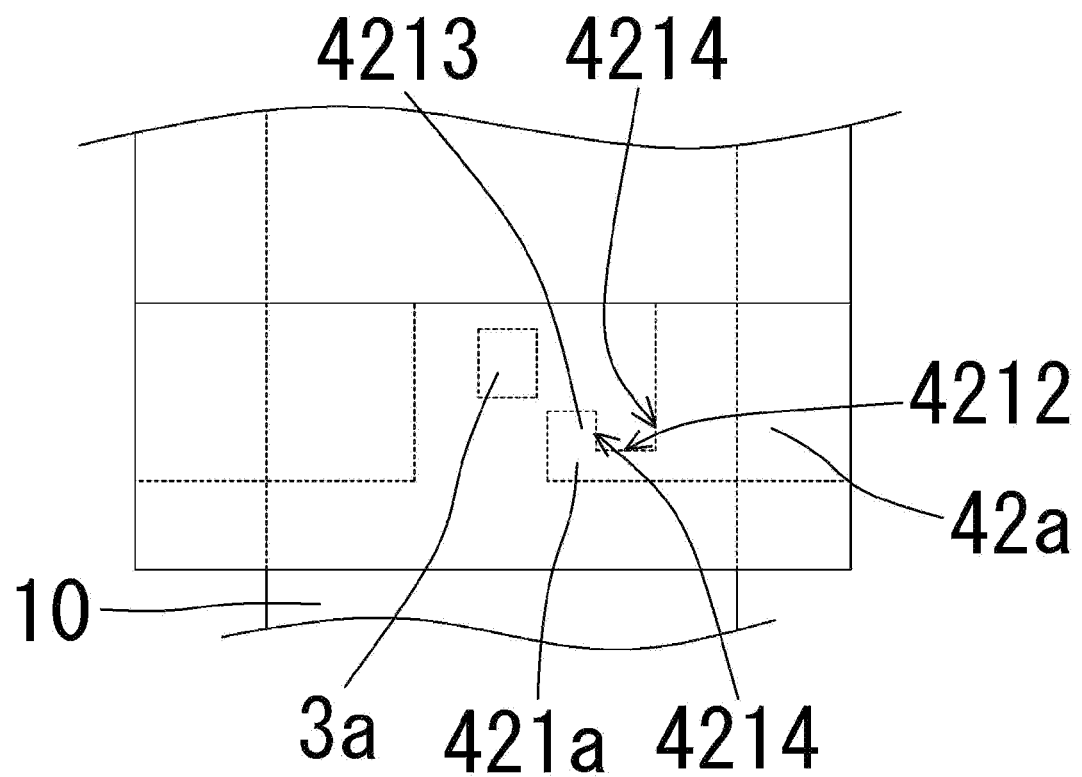
Figure 30D:
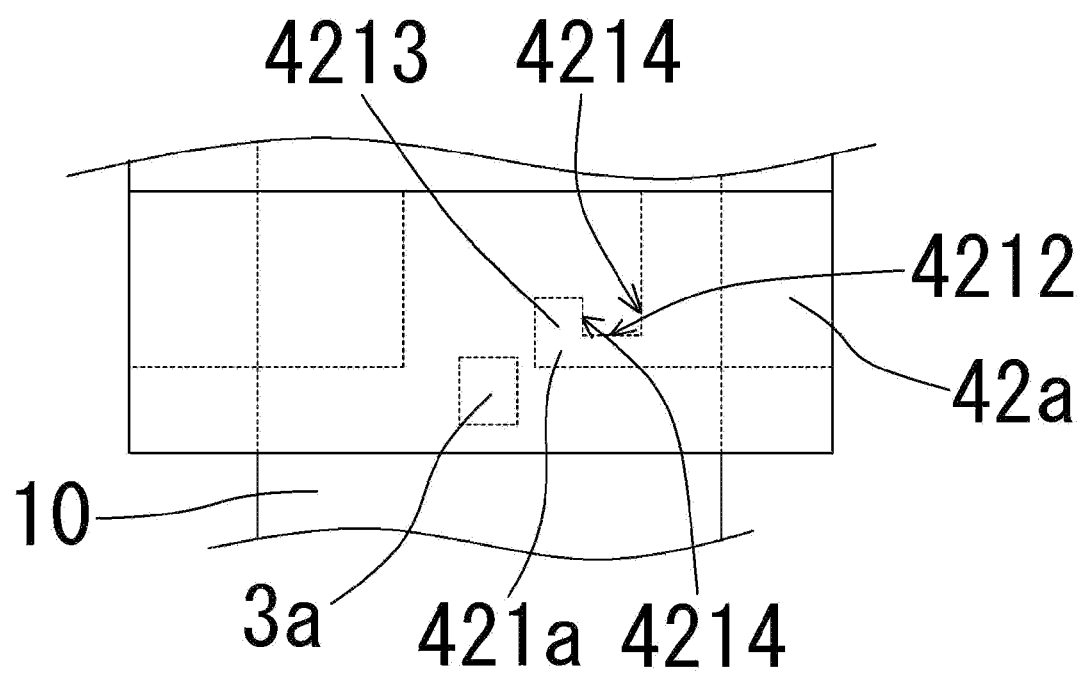
Figure 31:
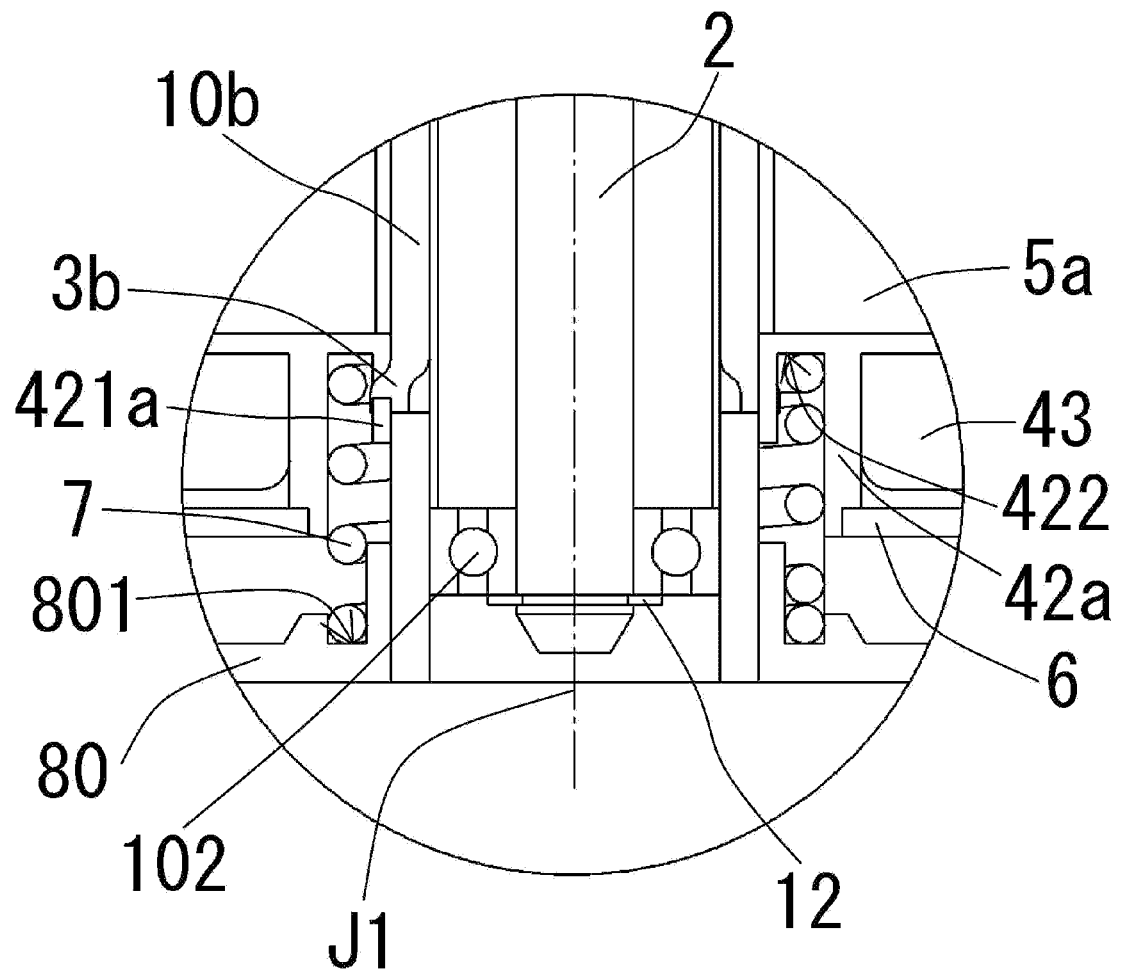
FIG. 31 is an enlarged view of an alternative armature supporting portion of the fan of the seventh preferred embodiment of the present invention.

FIG. 30C shows the details of the subsequent state after the armature 500 has been rotated relative to the bearing holder 10 in one circumferential direction from the state of FIG. 30B. FIG. 30D shows the details of the subsequent state after the armature 500 has been axially moved relative to the bearing holder 10 from the state of FIG. 30C. As shown in FIG. 30C, the armature 500 can be placed in the state in which it can be freely moved in the axial direction by being rotated relative to the bearing holder 100 in one circumferential direction. Then, when the armature 500 is moved relative to the bearing holder 10 in the axial direction, the armature 500 can be separated from the bearing holder 10, as shown in FIG. 30D.

As is apparent from the description above, the armature 500 is secured to and supported by the bearing holder 10 without using any adhesive in the axial fan A of the present preferred embodiment. Thus, it is easier to detach the armature 500 from the bearing holder 10 in the axial fan A than in conventional axial fans.

In the above description, the method for detaching the armature 500 from the bearing holder 10 is described. However, one having ordinary skill in the art would appreciate that the armature 500 can be attached to the bearing holder 100 by carrying out the above process in the reverse order. Thus, it is possible to attach the armature 500 to the bearing holder 10 more easily in the axial fan A of the present preferred embodiment than in conventional axial fans.

Although an axial fan is described in the present preferred embodiment, the present invention can be also applied to centrifugal fans. Moreover, the present invention can be applied not only to fans for delivering air but also to brushless motors.

Eighth Preferred Embodiment

Figure 32:
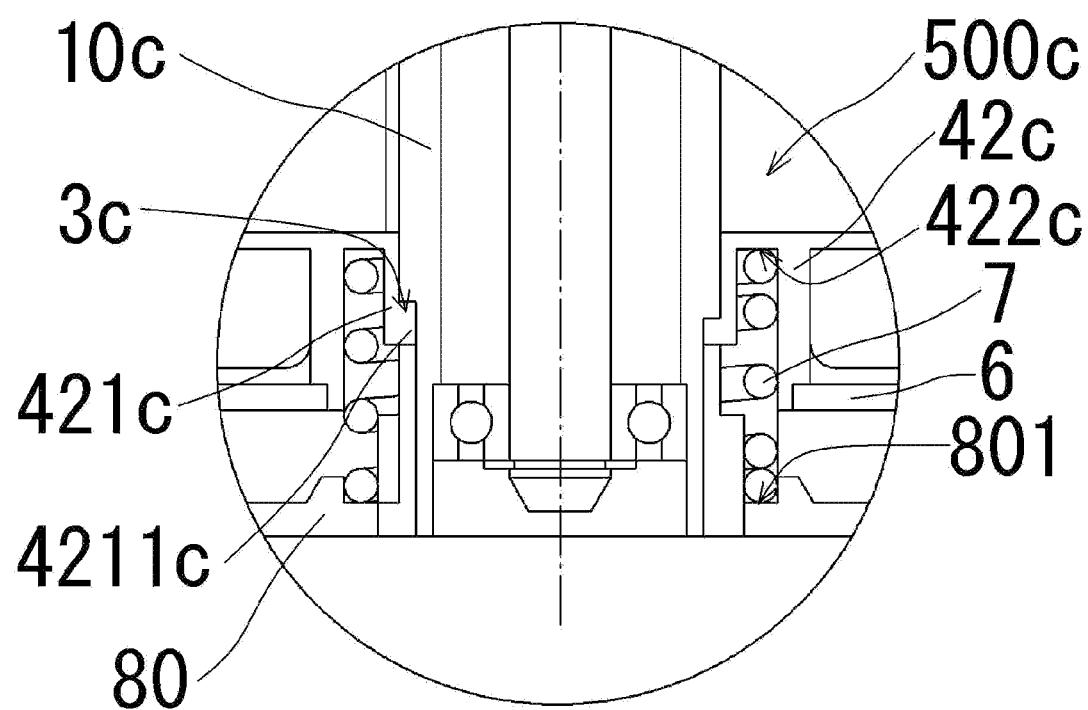
FIG. 32 is an enlarged cross-sectional view of a portion of an axial fan according to an eighth preferred embodiment of the present invention.
Figure 33:
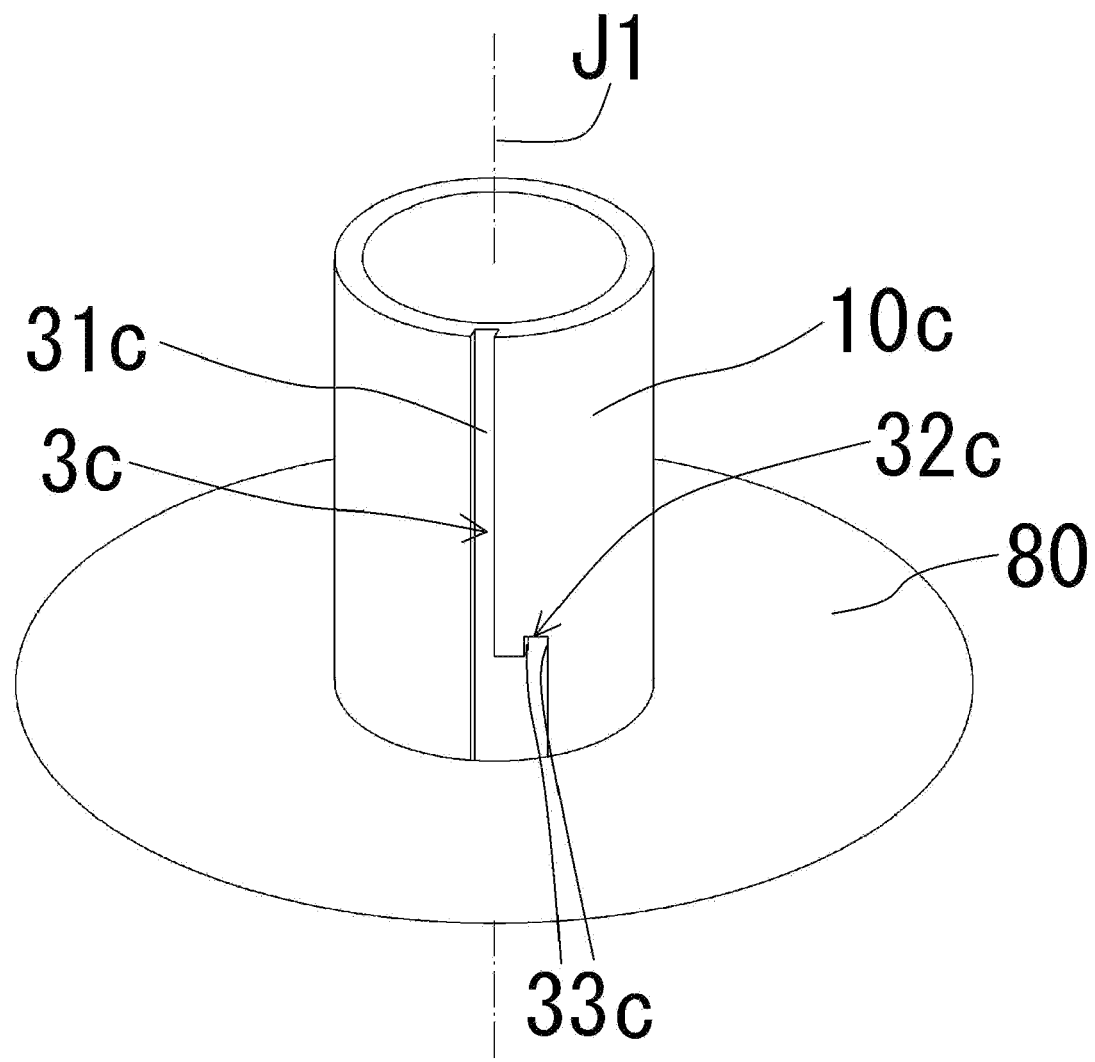
FIG. 33 is a perspective view of a housing of the axial fan including a bearing holder according to the eighth preferred embodiment of the present invention.

An axial fan according to an eighth preferred embodiment of the present invention is described referring to FIG. 32. FIG. 32 is an enlarged cross-sectional view of a portion of an axial fan B according to the eighth preferred embodiment of the present invention, taken along a plane containing its center axis J1 thereof. In FIG. 32, an armature supporting portion and portions around it are shown. FIG. 33 is a perspective view of a housing of the axial fan B including a bearing holder. FIGS. 34A to 34D show an exemplary process for detaching an armature 500*a* from a bearing holder 10*c*.

Referring to FIG. 32, the axial fan B is substantially the same as the axial fan A of the seventh preferred embodiment except for the structure for supporting an armature 500*c* relative to the bearing holder 10*c*. Like parts are given like reference numerals in the drawings and the following description, and the detailed description thereof is omitted.

The structure for supporting the armature 500*c* relative to the bearing holder 10*c* is now described. A base portion 80 is provided with a groove 801 near the boundary between the base portion 80 and the bearing holder 10*c*. The groove 801 is preferably substantially annularly shaped in the present preferred embodiment. In the groove 801, a helical coil spring 7 is arranged. The coil spring 7 extends upward in the axial direction along the outer side surface of the bearing holder 10*c*. The upper end of the coil spring 7 is in contact with a coil-spring supporting portion 422*c* which is preferably a portion of a lower insulator 42*c*. A distance between the coil-spring supporting portion 422*c* and the inner bottom surface of the groove 801 is shorter than the natural length of the coil spring 7. In this description, the natural length of the coil spring 7 is a length when no pressure is applied to the coil spring 7. Thus, when the coil spring 7 is arranged between the coil-spring supporting portion 422*c* and the inner bottom surface of the groove 801, a pressure is applied to the coil spring 7. That is, the coil spring 7 presses the armature 500*c* upward in the axial direction.

Referring to FIG. 32, the lower insulator 42*c* is provided with at least one hook-shaped projection 421*c* which extends downward in the axial direction, and radially inside the coil-spring supporting portion 422*c*. The hook-shaped projection 421*c* includes a radial protrusion 4211*c* at its axially lower end. The radial protrusion 4211*c* protrudes from the hook-shaped projection 421*c* radially inward. In the present preferred embodiment, four projections 421*c*, for example, preferably are circumferentially arranged at regular intervals.

Referring to FIG. 33, the outer side surface of the bearing holder 10*c* is provided with at least one groove 3*c* which extends axially. The groove 3*c* is arranged at a position corresponding to the hook-shaped projection 421*c*. In the present preferred embodiment, four grooves 3*c*, for example, preferably are provided on the outer side surface of the bearing holder 10*c*, and both the grooves 3*c* and the bearing holder 10*c* are preferably formed from resin or plastic integrally with each other by injection molding, for example.

In an upper portion of the groove 3*c* is arranged a protrusion-passing groove 31*c* which has such a circumferential width that the radial protrusion 4211*c* can pass therethrough. In other words, the circumferential width of the protrusion-passing groove 31*c* is larger than that of the radial protrusion 4211*c*. Moreover, in a lower portion of the groove 3*c*, the circumferential width of the groove 3*c* is at least twice as large as that of the radial protrusion 4211*c*. Hereinafter, this lower portion is referred to as an increased-width portion of the groove 3*c*. As shown in FIG. 33, a positioning portion is provided at the axially upper end of the increased-width portion of the groove 3*c*. In the present preferred embodiment, the positioning portion is arranged along a right side of the groove 3*c*, as shown in FIG. 33. The positioning portion includes a positioning surface 32*c* at its axially upper surface, and two side surfaces 33*c* on both circumferential sides of the positioning surface 32*c* which are spaced apart from each other. A distance between the side surfaces 33*c* of the positioning portion is larger than the circumferential width of the radial protrusion 4211*c*.

As described above, the coil spring 7 presses the armature 500*c* upward in the axial direction with a certain pressure. At the same time the radial protrusion 4211*c* presses the positioning surface 32*c* upward in the axial direction. Thus, a space is ensured between the inner bottom surface of the groove 801 and the coil-spring supporting portion 422.

With this configuration, vibration of the armature 500*c* generated while the rotor portion is rotating can be absorbed by the coil spring 7, thus reducing transfer of the vibrations to the bearing holder 10*c* and reducing vibration of the entire axial fan B.

Moreover, the circuit board 6 is preferably connected to the lower insulator 42*c* as described above. A magnetic sensor, which is a Hall element in the present preferred embodiment, is mounted on the circuit board 6. The magnetic sensor is used for detecting a change in magnetic fluxes of the rotor magnet 51 of the rotor portion and it is therefore necessary to keep the distance between the magnet sensor and the rotor magnet 51 substantially unchanged. Since the lower insulator 42*c* is positioned by the hook-shaped positioning portion 421*c* of the lower insulator 42c, the circuit board 6 can be always placed at substantially the same position in the axial direction relative to the bearing holder 10c. In other words, the position of the magnetic sensor relative to the bearing holder 10c can be kept unchanged. Alternatively, the circuit board 6 may be positioned relative to the bearing holder 10c by the stator core or the upper insulator. However, it is more preferable to position the circuit board 6 by the lower insulator 42c, considering tolerances of the components during manufacturing. This is because the circuit board 6 is directly supported by the lower insulator 42c.

Figure 34A:
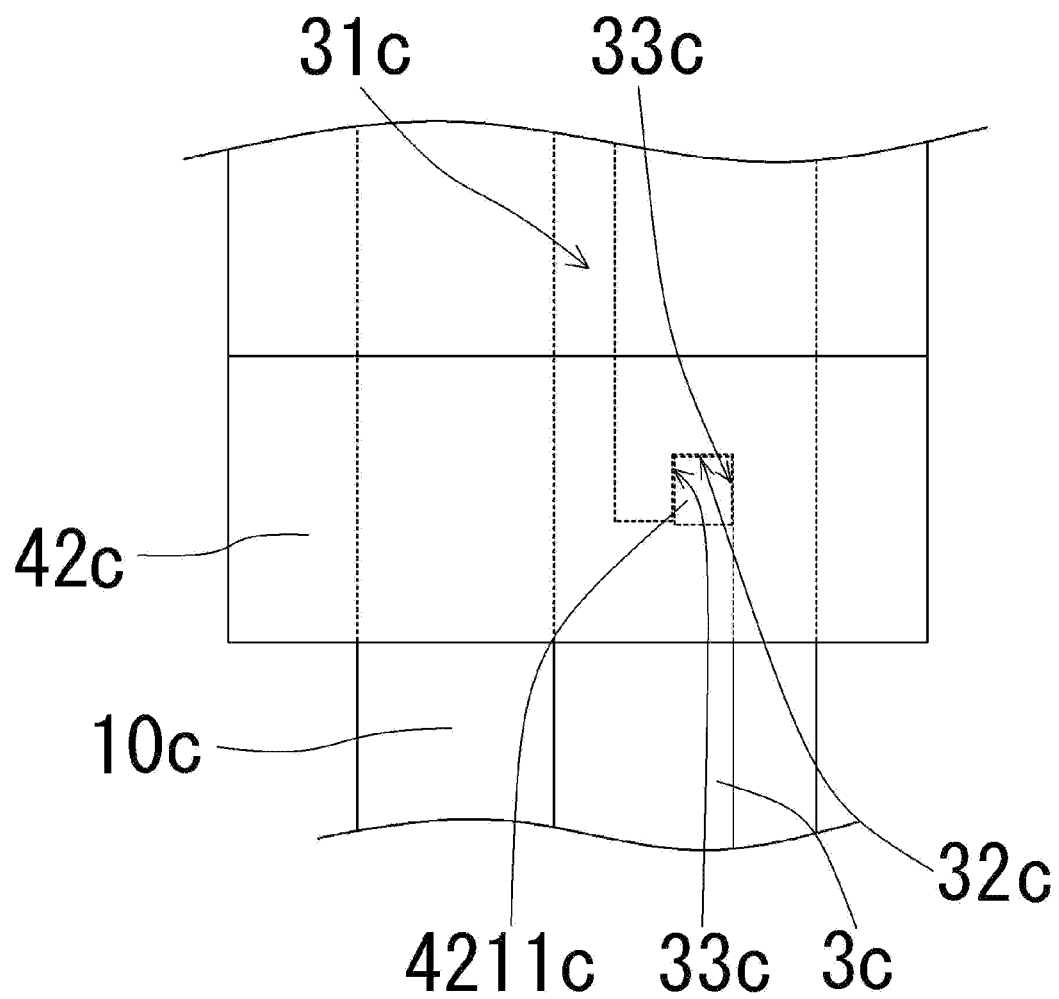
FIGS. 34A to 34D show an exemplary process for detaching an armature from the bearing holder according to the eighth preferred embodiment of the present invention.

Next, an exemplary process for detaching the armature 500c from the bearing holder 10c is described. FIGS. 34A to 34D show the process in detail. FIG. 34A shows a state where the armature 500c is positioned relative to the bearing holder 10c. In this state, the positioning surface 32c is pressed by the coil spring 7 against the radial protrusion 4211c so that the armature 500c is supported. Since the radial protrusion 4211c is located circumferentially between the side surfaces 33c of the positioning portion, circumferential movement of the armature 500c relative to the bearing holder 10c is restricted. Therefore, the armature 500c is hard to move relative to the bearing holder 10c unless an external force larger than a predetermined level is applied to the armature 500c.

Figure 34B:
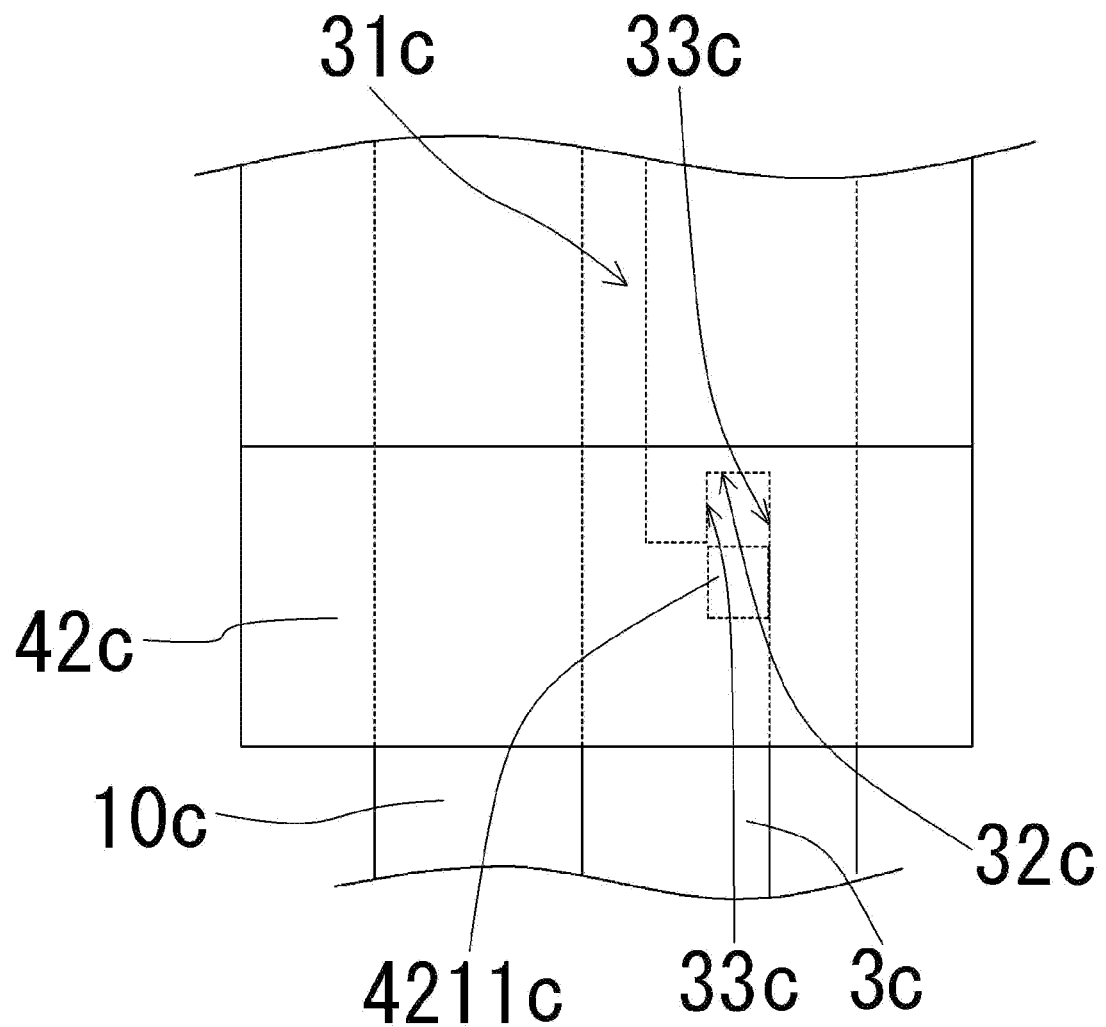

When an external force is applied to the armature 500c to move it relative to the bearing holder 10c axially downward, the radial protrusion 4211c is moved away from the positioning surface 32c, as shown in FIG. 34B. Thus, restriction of the axial and circumferential movement of the armature 500c relative to the bearing holder 10c is released. In this state, the radial protrusion 4211c and one side surface 33c do not circumferentially overlap, as shown in FIG. 34B. Therefore, the armature 500c can be rotated relative to the bearing holder 10c in one circumferential direction.

Figure 34C:
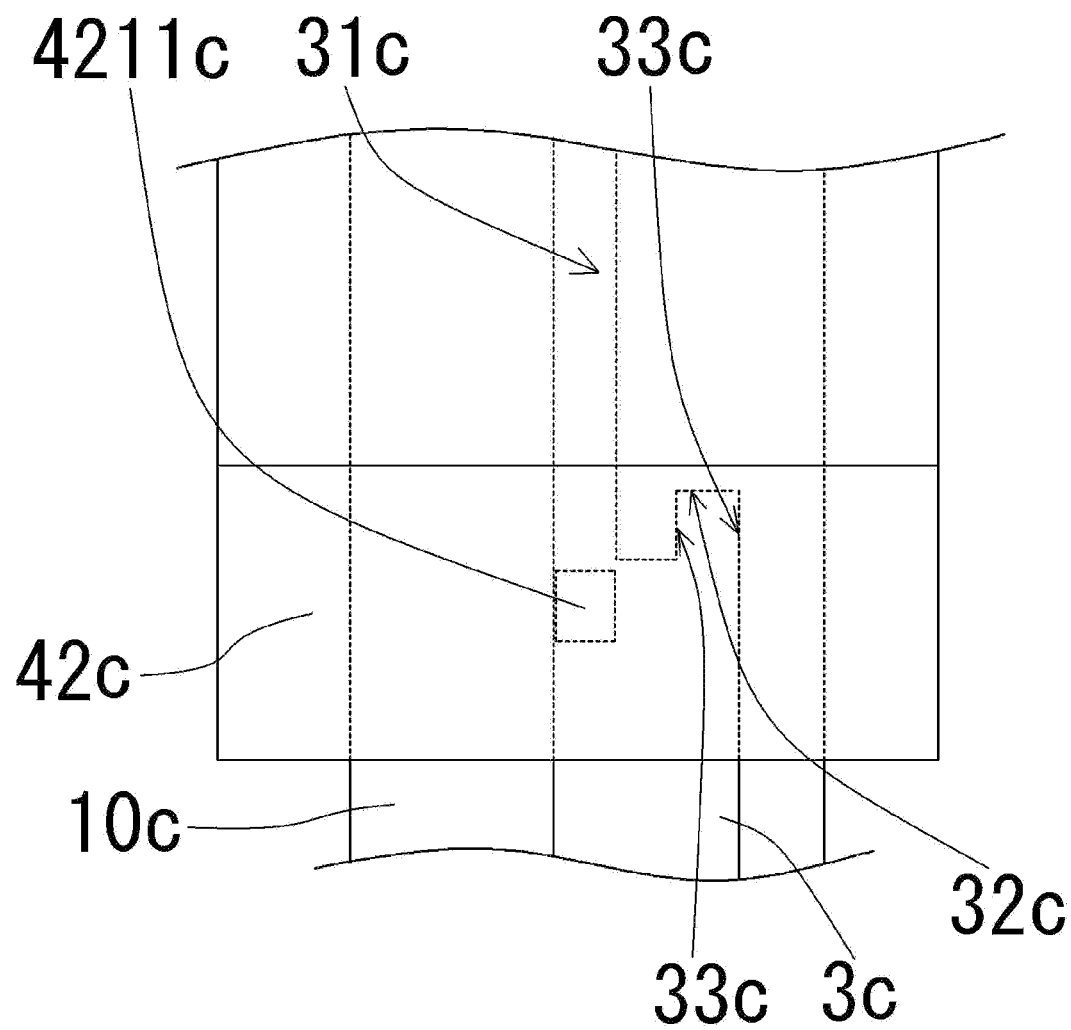
Figure 34D:
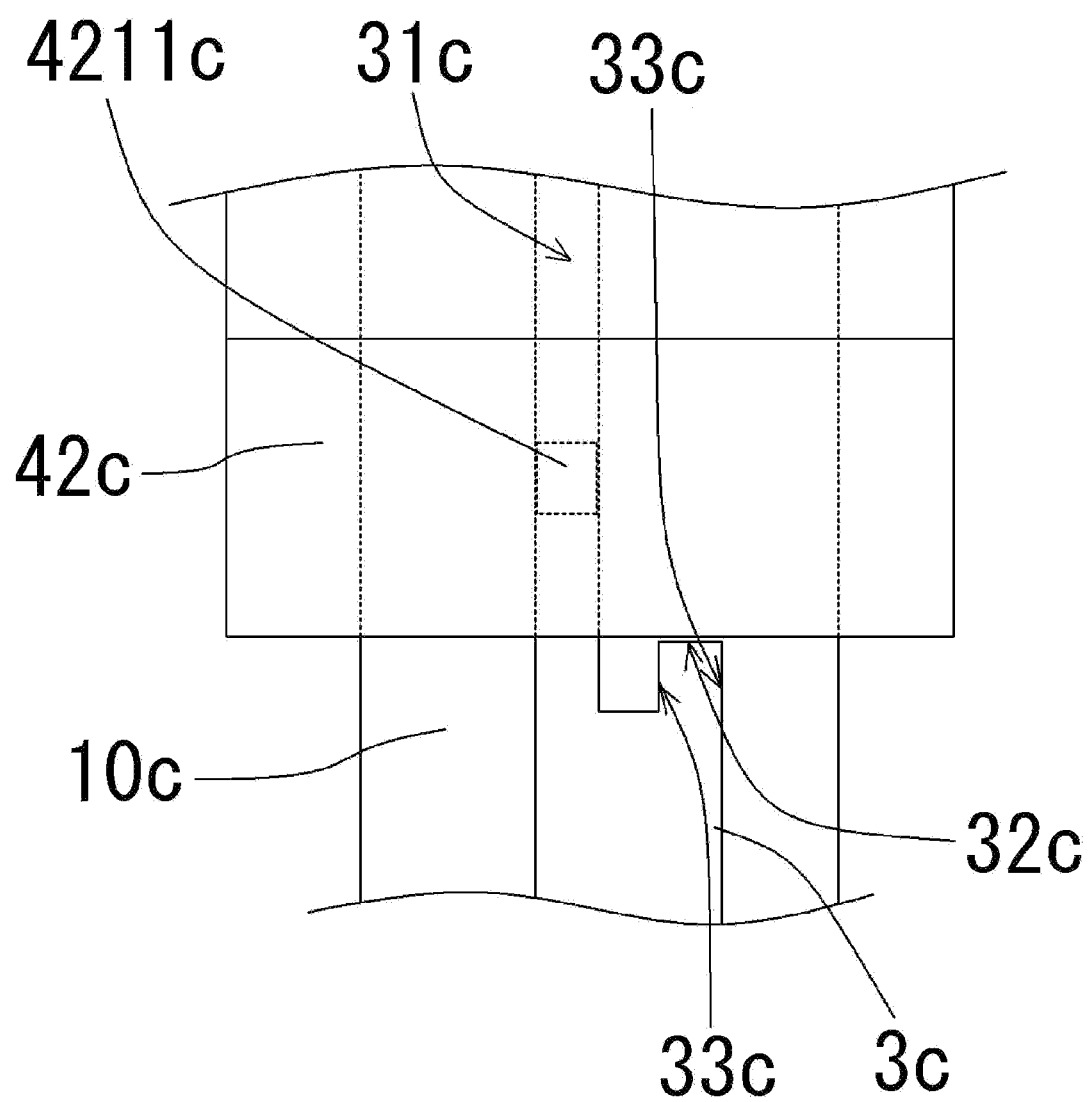

FIG. 34C shows the details of the subsequent state in which the armature 500c has been rotated relative to the bearing holder 10c from the state of FIG. 34B. Further, FIG. 34D shows the details of the subsequent state where the armature 500c has been axially moved relative to the bearing holder 10c from the state of FIG. 34C. When the armature 500c is rotated, i.e., circumferentially moved relative to the bearing holder 10c, the armature 500c is placed in a condition in which it can freely move in the axial direction. Furthermore, when the armature 500c is axially moved relative to the bearing holder 10c, the radial protrusion 4211c passes through the groove 31c and therefore the armature 500c can be separated from the bearing holder 10c.

As described above, in the axial fan B of the present preferred embodiment, the armature 500c is supported relative to the bearing holder 10c without using any adhesive. Also, another bonding technique such as crimping is not required. Thus, it is possible to more easily detach the armature 500c from the bearing holder 10c in the axial fan B than in conventional axial fans. Moreover, although the process for detaching the armature 500c from the bearing holder 10c is described above, the armature 500c can be attached to the bearing holder 10c by performing the above process in the reverse order. This means that the axial fan B of the present preferred embodiment allows the armature 500c to be attached to the bearing holder 10c more easily than conventional axial fans.

Although the above preferred embodiments refer to axial fans, the present invention can be also applied to centrifugal fans. Moreover, the present invention can be applied not only to fans for delivering air but also to brushless motors other than that used for fans.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A motor comprising:
    a rotor portion including a shaft and a rotor magnet and rotatable about a center axis;
    an armature arranged opposite to the rotor magnet to generate a torque therebetween;
    a circuit board arranged below the armature in an axial direction substantially parallel to the center axis and including a control circuit controlling rotation of the rotor portion;
    a base portion including a bearing holder which supports the armature on an outer side surface and the shaft on an inner side surface via a bearing member; and
    an elastic member; wherein
    the armature is pressed against the bearing holder in the axial direction via the elastic member.

2. The motor according to claim 1, wherein the elastic member is a helical coil spring arranged around the outer side surface of the bearing holder.

3. The motor according to claim 1, wherein the armature includes:
    a stator core made of magnetic material;
    an insulator covering the stator core; and
    a coil disposed around the stator core with the insulator therebetween; and
    the insulator is pressed against the bearing holder via the elastic member.

4. The motor according to claim 3, wherein the stator core and the bearing holder are spaced apart from each other in a radial direction substantially perpendicular to the center axis.

5. The motor according to claim 3, wherein the insulator includes a supporting portion supporting the elastic member.

6. The motor according to claim 5, wherein the insulator includes an upper insulator covering an axially upper portion of the stator core and a lower insulator covering an axially lower portion of the stator core, and the lower insulator includes the supporting portion.

7. The motor according to claim 6, wherein the outer side surface of the bearing holder is provided with at least one projection thereon, and the armature is pressed against the projection with the elastic member.

8. The motor according to claim 7, wherein the lower insulator includes a positioning portion axially pressing against the projection and axially positioning the bearing holder.

9. The motor according to claim 8, wherein the positioning portion includes a circumferential movement limiting portion which comes into contact with the projection to circumferentially position the bearing holder.

10. The motor according to claim 9, wherein the armature is arranged such that, when the armature is pressed downward in the axial direction, the positioning portion and the circumferential movement limiting portion are moved away from the projection to release positioning of the bearing holder in the circumferential direction and the radial direction, and the armature is able to be removed from the bearing holder by one of the armature and the bearing holder relative to the other.

11. A fan comprising the motor according to claim 10, further comprising an impeller provided outside the rotor to create an air flow by rotation thereof.

12. The motor according to claim 6, wherein the outer peripheral surface of the bearing holder is provided with at least one recess, and the armature is pressed against the at least one recess via the elastic member.

13. The motor according to claim 12, wherein the lower insulator has a positioning portion and is axially positioned relative to the bearing holder by axially pressing a top surface of the recess by the positioning portion.

14. The motor according to claim 13, wherein the positioning portion has a circumferential movement limiting portion capable of coming into contact with side surfaces of the recess which are arranged on both circumferential sides of the top surface thereof, wherein the lower insulator is circumferentially positioned relative to the bearing holder.

15. The motor according to claim 14, wherein armature is arranged such that the circumferential and axial positioning of the armature is released by pressing the armature axially downward, and then the armature is placed in a condition in which the armature can be separated from the bearing holder by rotating the armature relative to the bearing holder.

16. A fan comprising the motor according to claim 15, further comprising an impeller provided on the outer side surface of the rotor portion to create an air flow by rotation thereof.

* * * * *